United States Patent
Ranalli

(10) Patent No.: US 12,368,801 B2
(45) Date of Patent: Jul. 22, 2025

(54) VERIFIED CALLING PARTY INFORMATION DISPLAY CONFIRMATION SYSTEM

(71) Applicant: NetNumber, Inc., Marlborough, MA (US)

(72) Inventor: Douglas Ranalli, Naples, FL (US)

(73) Assignee: NetNumber, Inc., Marlborough, MA (US)

( * ) Notice: Subject to any disclaimer, the term of this patent is extended or adjusted under 35 U.S.C. 154(b) by 264 days.

(21) Appl. No.: 18/245,479

(22) PCT Filed: Sep. 14, 2021

(86) PCT No.: PCT/US2021/050215
§ 371 (c)(1),
(2) Date: Mar. 15, 2023

(87) PCT Pub. No.: WO2022/060705
PCT Pub. Date: Mar. 24, 2022

(65) Prior Publication Data
US 2023/0362299 A1 Nov. 9, 2023

Related U.S. Application Data

(63) Continuation-in-part of application No. 17/189,318, filed on Mar. 2, 2021, now abandoned.
(Continued)

(51) Int. Cl.
*H04M 3/42* (2006.01)
*H04L 9/32* (2006.01)
(Continued)

(52) U.S. Cl.
CPC ...... *H04M 3/42059* (2013.01); *H04L 9/3247* (2013.01); *H04L 65/1069* (2013.01);
(Continued)

(58) Field of Classification Search
USPC .................................................. 379/142.05
See application file for complete search history.

(56) References Cited

U.S. PATENT DOCUMENTS

6,738,613 B1 † 5/2004 Ogawa
9,596,348 B2 * 3/2017 Smith ............... H04M 3/42059
(Continued)

FOREIGN PATENT DOCUMENTS

JP H11120134 † 4/1999
JP 2008103861 † 5/2008

OTHER PUBLICATIONS

Wendt et al., "PASSporT: Personal Assertion Token; rfc8225.txt," PASSporT: Personal Assertion Token; Internet Engineering Task Force, IETD; Standard, Internet Society (ISOC) 4, Rue des Falaises Ch-1205 Geneva, Switzerland, pp. 1-25, XP015125355, Feb. 15, 2018.
(Continued)

*Primary Examiner* — Ahmad F. Matar
*Assistant Examiner* — Jirapon Tulop
(74) *Attorney, Agent, or Firm* — MEDLER FERRO WOODHOUSE & MILLS PLLC

(57) ABSTRACT

Disclosed are systems and methods for display confirmation of verified calling party attributes at the time of call establishment. A call initiation request corresponding to a calling party is received and includes a set of verified calling party attributes. A subset of the verified calling party attributes is provided for display on a communication device associated with a call recipient identified by the call initiation request and in response, a display acknowledgement is obtained, comprising a listing of verified calling party attributes recorded as being displayed during establishment of a communication session between the calling party and the call recipient. The display acknowledgement is validated and a display confirmation is generated to indicate particular veri- (Continued)

```
POST /dcs/v2/entries/19785551212 HTTP/1.1
Host: http://xx.xx.xx.xx
Content-Type: application/json
Content-Length: xx {
    "tsp":"Verizon USA",
    "dest":{"tn":"12125551111"},
    "iat":1443208345,
    "nam":"Dentist Office",
    "logo":{"https://logo.sp.com/Dentist.jpg"},
    "crn":"Confirming Appointment",
    "result":"Answered",
    "sn":"10:e6:fc:62:b7:41:8a:d5:00:5e:45:b6"
}
``` fied calling party attributes that were successfully displayed during establishment of the communication session.

30 Claims, 18 Drawing Sheets

Related U.S. Application Data

(60) Provisional application No. 63/079,357, filed on Sep. 16, 2020.

(51) Int. Cl.
    *H04L 65/1069*     (2022.01)
    *H04L 65/1096*     (2022.01)
    *H04L 65/1104*     (2022.01)
    *H04M 3/436*     (2006.01)

(52) U.S. Cl.
    CPC ...... *H04L 65/1096* (2013.01); *H04L 65/1104* (2022.05); *H04M 3/4365* (2013.01); *H04M 2201/42* (2013.01)

(56) References Cited

U.S. PATENT DOCUMENTS

| | | | |
|---|---|---|---|
| 10,149,156 B1 * | 12/2018 | Tiku | ............ H04W 12/66 |
| 10,666,798 B2 * | 5/2020 | Bharrat | ............ H04M 3/541 |
| 10,674,009 B1 | 6/2020 | Jakobsson | |
| 11,005,989 B1 | 5/2021 | Jakobsson | |
| 11,856,132 B2 | 12/2023 | Jakobsson | |
| 2013/0156176 A1 † | 6/2013 | Smith | |
| 2018/0270678 A1 * | 9/2018 | Munar | ............ H04M 3/2227 |
| 2019/0174000 A1 † | 6/2019 | Bharrat | |
| 2019/0394328 A1 | 12/2019 | Agarwal | |
| 2020/0028690 A1 * | 1/2020 | Barakat | ............ H04L 9/3247 |
| 2020/0053136 A1 * | 2/2020 | Filart | ............ H04L 65/1096 |
| 2020/0153959 A1 | 5/2020 | Scivicque | |
| 2020/0221302 A1 | 7/2020 | Filart et al. | |
| 2020/0252503 A1 | 8/2020 | Li | |
| 2022/0086276 A1 | 3/2022 | Ranalli | |

OTHER PUBLICATIONS

International Search Report and Written Opinion in related international application No. PCT/US2021/050215 issued on Jan. 3, 2022.

J. Peterson et al., PASSporT Extension for Rich Call Data, Published Jul. 3, 2017, Network Working Group, pp. 1-10.†

\* cited by examiner
† cited by third party

```
Protected Header
{
    "alg":"ES256",
    "typ":"passport",
    "ppt":"rcd",
    "x5u":"https://biloxi.example.org/biloxi.cer"
}
Payload
{
    "dest":{"tn":["12155551213"]}
    "iat":1443208345,
    "orig":{"tn":"12155551212"},
    "rcd":{"nam":"Dentist Office","jcd": ["vcard",[["logo",{},"uri",
        "https://logo.service-provider.com/DentistLogo.jpg"]]]}
    "rcdi": "sha256-u5AZzq6A9RINQZngK7T62em8M",
    "crn": "Dentist Appointment Reminder"
}
```

FIG. 2

Request (JSON data format)

```
POST /rcd/stir/v1/signing HTTP/1.1
Host: rcd-shaken.servicecloud.com
Authorization: Basic 00112233-4455-6677-8899
Content-Length: xx {"signingRequest":{
"orig":{"tn":"19785551212"},"dest":{"tn":["12125551111"]},
"rcd":{"reason":"Confirming Delivery Appointment"}}
}
```
← 501

Successful Response Example

```
HTTPS/1.1 200 OK
Content-Type: application/json;charset=UTF-8
Content-Length: xx {
  "response_code" : 0,
  "message" : "Success",
  "signingResponse":{"identity":"ewOKImFsZyI6IcJFUzIINiIsDQoicHBOIjoiInJjZCIsDQoidHlwIjogInBhc3N
wb3JOIiwNCiJ4NXUiOiAiaHROcHM6Ly9jZXJ0Lmv2cy5uZXRudWlzXIubmV0L2IxNWQ3Y2M5iTBmMjYtNDZjMiO4M2VhL
WE2ZTYzYTgyZWMzYS83Y2M0ZGI2OTVKMTNIZGFKYTRKMWY5ODYxYjIiOBmZS5jcnQiDQp9Qo.eyJhdHRlc3QiOiOiJBIiw
NCiJvcmlnIjp7InRuIjoiMTk3ODI1MjEyMjEyMzQiDQp9LCJkZXNOIjp7InRuIjpbIjE5NzgiNTU1MjEyMjEyMzQiXTE161
jE1NZEwOTk2MzAiLAoKIm9yaWdpZCI6IjEyM2U0NTY3LWU4OTItMTJKMyihNDU2LTQyNjYLNTQ0MDAwMCIsDQoicmNkIjp
7Im5hbSI6IkpbbWVZIEJvbmOiLCAiamNsIjoiaHROcHM6Ly9kb2lhaW4vamFtZXNfYm9uZCI9fQ0K;info=<https://ce
rt.rcd-shaken.servicecloud.com/b15d7cc9a3e63a82ec3a/7cc4db695d13edada4d1f9861b9b80fe.crt>"}
}
```
← 502

FIG. 5

```
Protected Header
{
    "alg":"ES256",
    "typ":"passport",
    "ppt":"shaken",
    "x5u":"https://biloxi.example.org/biloxi.cer"
}
Payload
{
    "attest":"A"
    "dest":{"tn":["12155551213"]}
    "iat":1443208345,
    "orig":{"tn":"12155551212"},
    "origid":"123e4567-e89b-12d3-a456-426655440000"
}
```

FIG. 8

```
Protected Header
{
    "alg":"ES256",
    "typ":"passport",
    "ppt":"shaken",
    "x5u":"https://biloxi.example.org/biloxi.cer"
}
Payload
{
    "attest":"A"
    "dest":{"tn":["12155551213"]}
    "iat":1443208345,
    "orig":{"tn":"12155551212"},
    "origid":"123e4567-e89b-12d3-a456-426655440000",
    "rcd":{"nam":"Dentist Office","jcd":["vcard",[["logo",{},"uri",
        "https://logo.service-provider.com/DentistLogo.jpg"]]]}
    "rcdi":"sha256-u5AZzq6A9RINQZngK7T62em8M",
    "crn":"Dentist Appointment Reminder"
}
```

FIG. 9

```
POST /dcs/v2/entries/19785551212 HTTP/1.1
Host: http://xx.xx.xx.xx
Content-Type: application/json
Content-Length: xx {
    "tsp":"Verizon USA",
    "dest":{"tn":"12125551111"},
    "iat":1443208345,
    "nam":"Dentist Office",
    "logo":{"https://logo.sp.com/Dentist.jpg"},
    "crn":"Confirming Appointment",
    "result":"Answered",
    "sn":"10:e6:fc:62:b7:41:8a:d5:00:5e:45:b6"
}
```

FIG. 10

```
Protected Header
{
    "alg":"ES256"
    "typ":"passport",
    "x5u":"https://del-cert.example.org/passport.cer"
}
Payload
{
    "dest":{"tn":["12155551213"]},
    "iat":1471375418,
    "orig":{"tn":"12155551212"}
}
```

FIG. 15

VERIFIED CALLING PARTY INFORMATION DISPLAY CONFIRMATION SYSTEM

CROSS-REFERENCE TO RELATED APPLICATIONS

This application claims the benefit of priority to U.S. Provisional Application No. 63/079,357 filed Sep. 16, 2020 and entitled "VERIFIED CALLING PARTY INFORMATION DISPLAY CONFIRMATION SYSTEM," and claims the benefit of priority to U.S. patent application Ser. No. 17/189,318 filed Mar. 2, 2021 and entitled "VERIFIED CALLING PARTY INFORMATION DISPLAY CONFIRMATION SYSTEM," the disclosures of which are both herein incorporated by reference in their entirety.

TECHNICAL FIELD

The present disclosure pertains to secure call establishment on a public phone network and more particularly to secure call establishment for the mitigation of fraudulent calls.

BACKGROUND

Illegitimate caller identity spoofing on the public phone network is a significant concern among telecommunication service providers, government legislators, regulatory bodies, and end-users on a global basis. Identity spoofing, in general, refers to an action of assuming the identity of some other entity (e.g., human, or non-human), and utilizing the spoofed identity to deceive. In the context of the public phone network, the concept of caller identity is often determined in relation to the telephone number utilized by the calling party. Identity spoofing on the public phone network often takes the form of fraudsters originating calls using another entity's calling telephone number for the purpose of defrauding a call recipient.

Telecommunication providers are beginning to deploy a set of technology standards referred to as STIR/SHAKEN (Secure Telephone Identity Revisited, and Signature-based Handling of Asserted Information Using toKENs, respectively), which are intended to eliminate identity spoofing on the public phone network. STIR/SHAKEN is implemented by requiring service providers to verify and attest to the identity of a calling-party entity and its right to use a given calling party telephone number at the time of call origination, e.g., through the use of digital certificates to cryptographically sign calls at the time of call origination and verify calls at the time of call termination.

More particularly, STIR (Secure Telephone Identity Revisited) is a set of Internet Engineering Task Force (IETF) standards that define how to pass a verified calling party telephone number within SIP call signaling by including a cryptographically signed PASSporT (Personal Assertion Token) in an SIP INVITE message. The Session Initiation Protocol (SIP) is a signaling protocol used for initiating, maintaining, and terminating real-time sessions that include voice, video, and messaging applications.

SHAKEN (Signature-based Handling of Asserted Information Using toKENs) is a set of Alliance for Telecommunications Industry Standards (ATIS) standards that define how the STIR protocols are to be used on the public telephone network under regulatory mandates issued by the Federal Communications Commission (FCC) in the United States.

PASSporT (Personal Assertion Token) is an IETF standard that defines a JSON Web Token structure for identifying the originator of a communication that is cryptographically signed to protect the identity of the originator such that the PASSporT can be transmitted to a destination in a secure fashion. In the context of the public phone network the cryptographically signed PASSporT is commonly transmitted from origin to destination in SIP signaling. JavaScript Object Notation (JSON) is an open standard file format and data interchange format, that uses human-readable text to store and transmit data objects consisting of attribute-value pairs. A SHAKEN PASSporT is a specific implementation of PASSporT used by service providers in the STIR/SHAKEN standards.

Deployment of STIR/SHAKEN is underway in the United States and other countries, with an initial focus on verifying and signing calls originated by end-user subscribers that are directly connected to an originating service provider that has direct knowledge of both the end-user subscriber and the telephone number that has been assigned to the end-user subscriber. STIR/SHAKEN solves the problem of verifying that a known calling entity is using a validly assigned calling telephone number when initiating a call. In its present form, STIR/SHAKEN enables a terminating service provider (i.e., associated with a call recipient device) and/or call recipient device itself to display a validated calling party telephone number to a call recipient at the time of call establishment.

Displaying a validated calling party telephone number is a critical component of restoring trust, but it is insufficient to meet the needs of enterprise customers. Enterprises using the public phone network face a particularly difficult problem today due to the proliferation of fraudulent calls on the network. Many fraudulent calls are instigated by entities (i.e., fraudsters) that claim to represent a valid enterprise when an unsuspecting person answers the phone. For example, fraudsters will often illegally originate a call using a calling telephone number associated with a valid enterprise in order to trick the call recipient into answering the phone. The result of originating calls with fake or spoofed calling telephone numbers has been that consumers have largely stopped answering the phone because they cannot trust who is calling. This places a significant burden on enterprises and institutions with legitimate and important reasons for having their calls answered. For example, legitimate enterprise calling scenarios include, but are not limited to, a hospital calling to confirm an upcoming surgery appointment, a retailer calling to schedule a date and time for delivery of a purchased item, a town or community calling its residents to warn of a mandatory fire evacuation, etc. When consumers or other end-user call recipients are unwilling to answer the phone due to lack of trust, a significant additional cost and operational complexity burden is placed on the enterprises and institutions that rely on the public phone network to reach their constituents and can additionally introduce various frictions and inconvenient communication burdens on the end-user call recipients themselves.

SUMMARY OF THE INVENTION

In accordance with one embodiment of the invention, a method for display confirmation of verified calling party information is provided, the method comprising: receiving a call initiation request corresponding to a calling party, the call initiation request including a set of verified calling party attributes; providing, for display on a communication device associated with a call recipient identified by the call initiation request, a subset of the verified calling party attributes, wherein the subset comprises some or all of verified calling party attributes of the set of verified calling party attributes; obtaining, in response to providing the subset of verified calling party attributes for display on the communication device, a display acknowledgement comprising a listing of verified calling party attributes recorded as being displayed during establishment of a communication session between the calling party and the call recipient; and validating the display acknowledgement and generating a display confirmation of verified calling party attributes that were successfully displayed during establishment of the communication session.

In one embodiment, the set of verified calling party attributes includes one or more of a calling party name, a calling party logo, a calling party image, and a call reason indicating a purpose of the call initiation request.

In one embodiment, the set of verified calling party attributes is received in an IDENTITY header of an SIP (Session Initiation Protocol) INVITE call establishment message; and one or more verified calling party attributes of the set of verified calling party attributes comprise Rich Call Data (RCD) claims.

In one embodiment, the set of verified calling party attributes is cryptographically signed with a cryptographic signature comprising one or more of a calling party signature, an originating service provider signature, and a contracted party signature, the contracted party signature corresponding to a vendor or third-party provider representing the calling party.

In one embodiment, the cryptographic signature is used to sign an RCD (Rich Call Data) PASSporT (Personal Assertion Token) containing the set of verified calling party attributes or the subset of verified calling party attributes.

In one embodiment, the RCD PASSporT is generated in response to passing one or more selection parameters to an RCD PASSporT signing function, the selection parameters identifying one or more pre-determined verified calling party attributes for inclusion in the RCD PASSporT.

In one embodiment, the selection parameters identify a desired version of pre-defined calling party attributes for inclusion in the RCD PASSporT.

In one embodiment, the cryptographic signature is used to sign a SHAKEN (Signature-based Handling of Asserted Information using toKENs) PASSporT containing the set of verified calling party attributes or the subset of verified calling party attributes.

In one embodiment, the method further comprises: transmitting the subset of verified calling party attributes to the communication device associated with the call recipient; displaying, on a user interface of the communication device, one or more verified calling attributes of the subset of verified calling party attributes; and generating the display acknowledgement to include each of the one or more verified calling attributes displayed on the user interface of the communication device.

In one embodiment, the display acknowledgement is generated by one or more of: a terminating service provider associated with the call recipient or the communication device associated with the call recipient.

In one embodiment, the display acknowledgement comprises an HTTPS/JSON POST message.

In one embodiment, generating the display acknowledgement is based at least in part on accessing one or more call detail record (CDR) databases associated with a terminating service provider network that transmitted the subset of verified calling party attributes to the communication device associated with the call recipient.

In one embodiment, the method further comprises: obtaining the display acknowledgement to include call handling data associated with the establishment of the communication session between the calling party and the call recipient, the call handling data including one or more of: an indication that the call recipient communication device was disconnected from a terminating service provider network at a time of attempted establishment of the communication session; an indication that the communication session was routed to a voicemail service of the call recipient communication device; and an indication that the call recipient communication device accepted the communication session.

In one embodiment, the method further comprises: determining one or more display capability properties of the communication device associated with the call recipient device; and generating the subset of verified calling party attributes based at least in part on the display capability properties of the communication device, wherein: a given verified calling party attribute is excluded from the subset for display on the communication device in response to a determination that the given verified calling party attribute is incompatible with the display capability properties of the communication device.

In one embodiment, the method further comprises: retrieving the calling party image from a database storing a plurality of pre-vetted calling party images, wherein the calling party image is retrieved based on one or more of a calling party telephone number indicated by the call initiation request and the calling party name; and concatenating the retrieved calling party image to the subset of verified calling party attributes, prior to providing the subset of verified calling party attributes for display on the call recipient communication device.

In accordance with another embodiment of the invention, a system for display confirmation of verified calling party information at time of call establishment is provided, the system comprising: a terminating service provider network, wherein the terminating service provider network receives a call initiation request corresponding to a calling party and including a set of verified calling party attributes; a call recipient communication device, wherein the call recipient communication device is associated with a call recipient identified by the call initiation request, such that the call recipient communication device receives a subset of the verified calling party attributes from the terminating service provider network; and a display confirmation service (DCS) communicatively coupled to one or more of the terminating service provider network and the call recipient communication device, wherein the DCS: obtains a display acknowledgement comprising a listing of verified calling party attributes recorded as being displayed during establishment of a communication session between the calling party and the call recipient; validates the display acknowledgement; and based at least in part on the validation, generates a display confirmation of verified calling party attributes determined as being successfully displayed by the call recipient communication device during establishment of the communication session.

In one embodiment, the set of verified calling party attributes includes one or more of a calling party name, a calling party logo, a calling party image, and a call reason indicating a purpose of the call initiation request.

In one embodiment, the system further comprises an RCD (Rich Call Data) PASSporT (Personal Assertion Token) signing function, wherein the RCD PASSporT signing function: receives the set of verified calling party attributes in a request from the calling party; and generates an RCD PASSporT having a cryptographic signature corresponding to the calling party and containing the set of verified calling party attributes as an RCD payload.

In one embodiment, the system further comprises an RCD (Rich Call Data) PASSporT (Personal Assertion Token) signing function, wherein the RCD PASSporT signing function: receives the set of verified calling party attributes in a request transmitted from an originating service provider network associated with the calling party; and generates an RCD PASSporT having a cryptographic signature corresponding to the calling party and containing the set of verified calling party attributes as an RCD payload.

In one embodiment, the RCD PASSporT signing function generates the RCD PASSporT in response to being passed one or more selection parameters, the selection parameters identifying at least a first pre-determined verified calling party attribute for inclusion in the RCD PASSporT.

In one embodiment, the set of verified calling party attributes is received in an IDENTITY header of an SIP (Session Initiation Protocol) INVITE call establishment message; and one or more verified calling party attributes of the set of verified calling party attributes comprise Rich Call Data (RCD) claims.

In one embodiment, the set of verified calling party attributes is cryptographically signed with a cryptographic signature prior to being received by the terminating service provider network, the cryptographic signature comprising one or more of: a calling party signature; an originating service provider signature; and a contracted party signature, the contracted party signature corresponding to a vendor or third-party provider representing the calling party.

In one embodiment, the originating service provider signature is used to sign a SHAKEN (Signature-based Handling of Asserted Information using toKENs) PASSporT containing the set of verified calling party attributes or the subset of verified calling party attributes.

In one embodiment, the call recipient communication device generates and transmits the display acknowledgement to the DCS, the display acknowledgement generated to include each of the one or more verified calling attributes displayed on the user interface of the communication device.

In one embodiment, the terminating service provider generates and transmits the display acknowledgement to the DCS, the display acknowledgement comprising a listing of verified calling party attributes transmitted to the call recipient communication device by the terminating service provider.

In one embodiment, the display acknowledgement generated by the recipient communication device, or by the terminating service provider, acknowledges that verified calling party attributes were displayed, without indicating which specific attributes were displayed. In some embodiments, the display acknowledgement includes both the list of calling party attributes (e.g. "nam") and the data that was displayed with each attribute (e.g., "nam:Douglas Ranalli"). In some embodiments, the display acknowledgement only identifies the attributes displayed (e.g., "nam", "logo", "reason") without the specific display data associated with each attribute.

In one embodiment, the display acknowledgement comprises an HTTPS/JSON POST message.

In one embodiment, the DCS obtains the display acknowledgement by accessing one or more call detail record (CDR) databases associated with the terminating service provider network.

In one embodiment, the DCS further receives call handling data associated with the establishment of the communication session between the calling party and the call recipient, the call handling data including one or more of: an indication that the call recipient communication device was disconnected from the terminating service provider network at a time of attempted establishment of the communication session; an indication that the communication session was routed to a voicemail service of the call recipient communication device; and an indication that the call recipient communication device accepted the communication session.

In one embodiment, the subset of verified calling party attributes received by the call recipient communication device is generated based at least in part on one or more display capabilities of the call recipient communication device, such that a given verified calling party attribute is excluded from the subset in response to a determination that the given verified calling party attribute is incompatible with the display capability properties of the call recipient communication device.

In one embodiment, the system further comprises: a database storing a plurality of pre-vetted verified calling party attributes, the pre-vetted verified calling party attributes indexable by one or more of the calling party name, a calling party telephone number indicated by the call initiation request, or pre-determined indexing parameters specified by the call initiation request.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of the same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which:

FIG. 2 depicts an example of a decoded RCD PASSporT containing validated calling party information in the form of "nam", "logo" and "crn" attributes;

FIG. 5 depicts an example API function call to an external RCD PASSporT signing function using an HTTPS POST method that returns a base64url encoded signed RCD PASSporT in the form of an SIP IDENTITY header;

FIG. 8 depicts an example of a SHAKEN PASSporT from the ATIS STIR/SHAKEN specifications;

FIG. 9 depicts an example of a SHAKEN PASSporT with embedded RCD claims;

FIG. 10 depicts an example of an API call to a display confirmation service in the form of an HTTP POST message with a JSON body containing a list of verified calling party attributes displayed to a call recipient along with other aspects of the call useful to the display confirmation service;

FIG. 15 depicts an example of a decoded base PASSporT that can be used to pass verified calling-TN and called-TN information without including any additional verified calling party information;

DETAILED DESCRIPTION

Figure 1A:
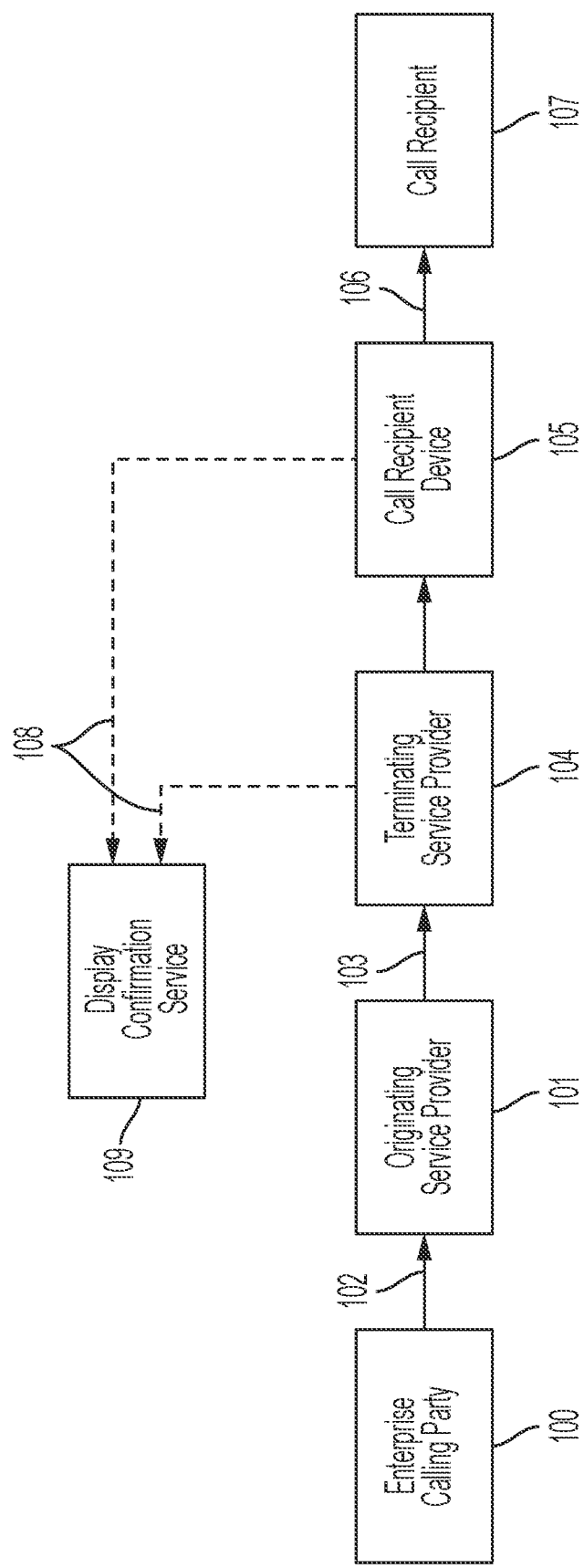
FIG. 1A is a diagram depicting participants in a call establishment process augmented by a display confirmation system according to one or more aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

The present disclosure describes systems, methods and techniques for confirming and documenting the display of verified enterprise calling party information attributes during the establishment of a call on the public phone and other communication networks. For example, the existing public phone network, as well as conventional approaches to the issues of secure call establishment and/or mitigating fraudulent calls, do not currently provide any mechanism for documenting whether verified calling party information (e.g., as provided by a calling party) was displayed to a call recipient at the time of call establishment. Accordingly, aspects of the present disclosure provide for the automatic collection, storage and sharing of information about the display of verified calling party information to a call recipient via a display confirmation service ("DCS"). In some embodiments, the presently disclosed DCS and other aspects of the present disclosure can be configured to be implemented within the STIR/SHAKEN framework, as will be explained in greater depth below. In addition to providing enterprises and other calling parties with confirmation(s) that a destination/terminating service provider has passed verified rich call data attributes to a call recipient device at the time of call establishment, in some embodiments the presently disclosed DCS can provide additional call handling information with respect to the same call establishment instance. The term "techniques," as used herein, may refer to system(s), method(s), computer-readable instruction(s), module(s), algorithms, hardware logic, and/or operation(s) as described above and through the disclosure.

Full value of the public phone network will be difficult for an enterprise calling party to realize or otherwise obtain unless call recipients are presented with sufficient verified calling party information, beyond just a verified calling party telephone number, that thereby enables the call recipient to answer the call with confidence as to its legitimacy. In the context of the present disclosure, verified calling party information includes, but is not limited to, descriptive information about a calling party that has been verified by a trusted entity using one or more industry accepted verification practices. For example, in the context of a voice call on the public phone network, verified enterprise calling party information can include a plurality of attributes (e.g., including one or more of: enterprise name, enterprise logo, reason for a call, calling party number, called party number, time of the call, etc.) that could be useful to a call recipient when making a decision whether or not to answer an incoming call.

According to the ATIS (Alliance for Telecommunications Industry Standards) 1000074 specification, the STIR/SHAKEN standard requires the originating service provider to attest to its knowledge of the identity of the calling party and to the right of the calling party to use a given calling party telephone number when initiating calls to the public phone network. Under the STIR/SHAKEN standards, the originating service provider generates and cryptographically signs a SHAKEN PASSporT that contains the calling telephone number, the called telephone number, the time of the call, and the attestation level assigned to the call by the originating service provider. The signed SHAKEN PASSporT is included in the SIP call signaling as a SIP IDENTITY header.

The ATIS 1000092 (delegate-certificates) and 1000094 (RCD PASSporT) specifications provide mechanisms that can be utilized to extend the SHAKEN standards to include optionally passing verified enterprise calling party information in SIP signaling via a cryptographically signed RCD PASSporT, e.g., using a delegate-certificate that uniquely identifies an originating enterprise calling party. Rich Call Data ("RCD" or "red") is a draft IETF standard that defines how a plurality of calling party attributes are optionally added to a PASSporT. The RCD PASSporT structure supports a plurality of verified enterprise calling party attributes (e.g., enterprise name, enterprise logo, reason for the call, calling party number, called party number, time of the call, etc.) and other optional attributes that can be used to further identify the calling party.

Empowering an enterprise calling party to include a cryptographically signed RCD PASSporT in a SIP INVITE message at the time of call origination adds value to the call establishment process but it does not replace the role played by the originating service provider. More particularly, when an RCD PASSporT is included by the enterprise calling party in a SIP INVITE message, the originating service provider is still responsible for generating and adding its own SHAKEN PASSporT to the SIP signaling before routing the call to the terminating service provider.

According to the STIR/SHAKEN standards, the originating service provider must generate and include this signed SHAKEN PASSporT in the call initiation SIP signaling. Still under discussion within the ATIS SHAKEN working group is whether the originating service provider should pass both the enterprise RCD PASSporT and its originating service provider SHAKEN PASSporT to the terminating service provider, or whether the verified enterprise calling party information contained in the enterprise RCD PASSporT (e.g. enterprise name, enterprise logo, reason for calling, etc.) should be incorporated into a single enhanced SHAKEN PASSporT that contains the enterprise RCD claims and the originating service provider SHAKEN PASSporT information. Both mechanisms achieve the goal of passing verified enterprise calling party information to the terminating service provider according to aspects of the present disclosure. It is appreciated that the above discussion of mechanisms for passing verified enterprise calling party information to the terminating service provider are provided for purposes of illustration and example, and are not to be construed as limiting, as would be appreciated by one of ordinary skill in the art.

The ATIS 1000096 (Out-of-Band SHAKEN) specification provides a mechanism by which an RCD PASSporT may be transported from a calling-party to a terminating service provider. This mechanism utilizes an out-of-band database service, referred to as a Call Placement Service ("CPS", e.g., referred to as "STI-CPS" in ATIS 1000096). In scenarios in which it may not be possible or practical to include an RCD PASSporT in SIP signaling, the CPS can provide a back-up mechanism by which a terminating service provider and/or a call recipient device, can download a missing RCD PASSporT, or SHAKEN PASSporT, associated with a specific call. As such, a CPS can be used to provide an optional mechanism for passing verified enterprise calling party attributes to a terminating service provider outside of the SIP signaling methods further described herein (an example of a display confirmation system provided with a CPS database is discussed in greater depth with respect to FIG. 1B).

Regardless of the specific technique used to pass verified enterprise calling party information from the originating service provider to the terminating service provider, it can be beneficial for the enterprise calling party (and/or the originating service provider) to know if the verified calling party information included with the call initiation signaling was presented to the call recipient at time of call origination. Accordingly, disclosed herein are systems and methods for display confirmation and information capture for verified calling party information displayed to a call recipient at the time of call establishment.

Figure 1B:
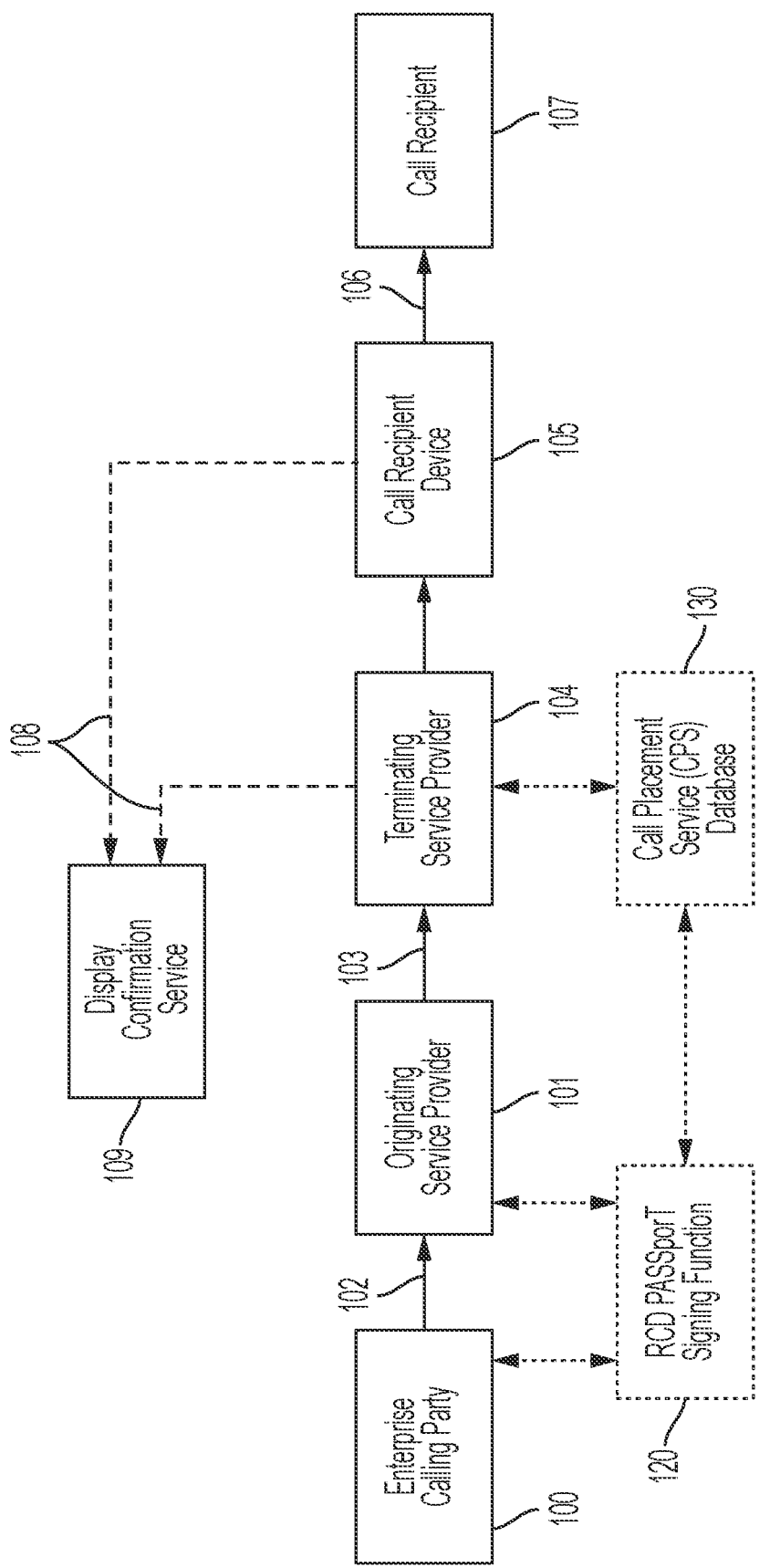
FIG. 1B is a diagram depicting participants in a call establishment process augmented by a display confirmation system including a Call Placement Service (CPS), according to one or more aspects of the present disclosure.

The disclosure turns now to FIGS. 1A and 1B, which depict diagrams of an example system for confirming and documenting the display of verified calling party information to a call recipient, according to aspects of the present disclosure. As illustrated, the system of FIG. 1A operates to confirm and document the display of verified calling party information to a call recipient on the public phone network, although it is appreciated that the system of FIG. 1A can operate on other phone networks without departing from the scope of the present disclosure. As illustrated, the system of FIG. 1B is the same as the system of FIG. 1A, but the system of FIG. 1B further includes an RCD PASSporT signing function 120 and a call placement service (CPS) database 130, which can be utilized to provide an out-of-band mechanism that allows terminating service providers to obtain or retrieve missing RCD and/or SHAKEN PASSporTs associated with a specific call. It is appreciated that in some embodiments, description made herein with reference to the example system of FIG. 1A can be applied to the example system of FIG. 1B; likewise, description made with reference to the example system of FIG. 1B can be applied to the example system of FIG. 1A.

Turning now to FIG. 1A, depicted is a display confirmation service (DCS) 109 that is integrated with a call flow or call connection comprising a calling party 100 (shown here as an enterprise calling party) and/or an originating service provider 101, a terminating service provider 104, a call recipient device 105, and a call recipient 107. When initiating or otherwise placing a call, enterprise calling party 100 generates or includes verified calling party information 102 in a call initiation request. As will be described in greater depth below, the verified calling party information 102 can include, but is not limited to, an enterprise name (e.g., the name of the enterprise calling party 100), an enterprise logo, a reason for the call, etc. More generally, verified calling party information 102 can be information that is provided by enterprise calling party 100 and/or is particular to the specific call being placed, where the information is identified as being potentially useful to the intended call recipient (here, call recipient 107) in making a decision as to whether or not to answer the incoming call.

In some embodiments, the verified calling party information 102 can be generated, compiled, or transmitted by an originating service provider 101 that is associated with enterprise calling party 100. For example, originating service provider 101 can automatically generate verified calling party information 102 based on one or more inputs provided by enterprise calling party 100. Additionally, or alternatively, originating service provider 101 can receive a portion of verified calling party information 102 from the enterprise calling party 100 (e.g., the reason for the particular call that is the subject of the call initiation request) and subsequently generate the verified calling party information 102 by augmenting the received portion of calling party information with the remaining or missing portion(s) of calling party information. In some embodiments, the various portions of calling party information to be included in verified calling party information 102 can be specified by enterprise calling party 100 or otherwise pre-determined by one or more of enterprise calling party 100 and originating service provider 101.

Once verified calling party information 102 is received and/or generated by originating service provider 101, it is included in a transmission 103 that is passed to terminating service provider 104 along with the other components of the call initiation request. As mentioned previously, one or more of originating service provider 101 and terminating service provider 104 can operate on the public telephone network and/or can operate on other networks.

Figure 17:
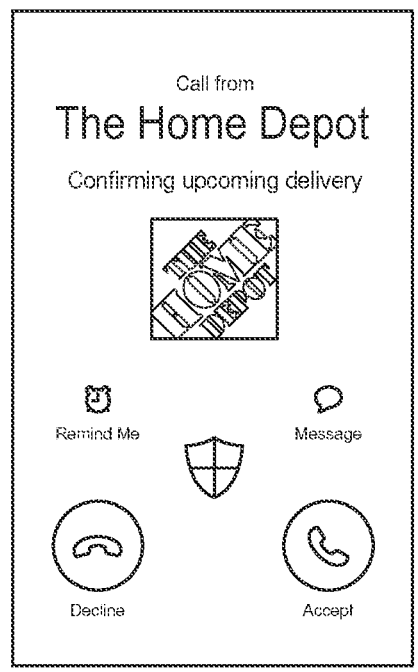
FIG. 17 depicts an example of a call display with verified calling party information presented to the call recipient, where the verified calling party information includes an enterprise name, enterprise logo and call reason.

Terminating service provider 104 initiates the call between enterprise calling party 100 and the call recipient 107 (e.g., via call recipient device 105) according to the call initiation request. When initiating the call, terminating service provider 104 passes some, or all, of the received verified calling party information 102 to call recipient device 105, where part, or all, of the verified calling party information is then displayed to call recipient 107 (see e.g., FIG. 17, showing an example call interface of a call recipient device that can be used to display the verified calling party information).

As illustrated, a display confirmation service (DCS) is communicatively coupled with terminating service provider 104 and/or call recipient device 105, e.g., over communicative links 108. This communicative coupling can occur over the same telephone network (public or otherwise) over which the call is being placed. In some embodiments, one or more links of the communicative coupling can be provided over the Internet or other communication networks, without departing from the scope of the present disclosure. One or more of the terminating service provider 104 and the call recipient device 105 communicates with DCS 109, indicating particular verified calling party information attributes that were displayed to call recipient 107 during call establishment. For example, terminating service provider 104 can simultaneously send one or more verified calling party information attributes (from the verified calling party information 102) to call recipient device 105 for display, while also sending a list of those particular verified calling party information attributes to DCS 109. In some embodiments, call recipient device 105 can also transmit to DCS 109 a list of verified calling party attributes that were actually displayed to call recipient 107, and DCS 109 can subsequently analyze the lists that were received from terminating service provider 104 and call recipient device 105 against each other.

In some embodiments, enterprise calling party 100, or its connected originating service provider 101, can be responsible for the step of including verified calling party information 102 with an outgoing call submitted to the public phone network. Several approaches can be utilized by enterprises and service providers in order to include verified calling party information 102 with a call initiation request at time of call initiation. For example, as mentioned above, enterprise calling party 100 can include verified calling party information 102 with an outbound call by including a cryptographically signed RCD PASSporT in the SIP call initiation signaling.

As mentioned previously, the system of FIG. 1B is illustrated as sharing the constituent elements of the system of FIG. 1A, which are described above. In at least some embodiments, the foregoing description made with respect to constituent portions and/or functions of the system of FIG. 1A apply equally to FIG. 1B. However, FIG. 1B further depicts an RCD PASSporT signing function 120 and a call placement service (CPS) database 130, which can be utilized to provide an out-of-band mechanism that allows terminating service provider 104 to obtain or retrieve missing RCD and/or SHAKEN PASSporTs associated with a specific call. The RCD PASSporT signing function 120 is shown as being optionally communicatively coupled to enterprise calling party 102, originating service provider 101, or both (examples of specific configurations and arrangement of the RCD PASSporT signing function, enterprise calling party, and originating service provider are discussed below with respect to FIGS. 3, 4, 6, and 7). Although not shown, in some embodiments RCD PASSporT signing function 120 can additionally be communicatively coupled to the display confirmation service (DCS) 109, as will be discussed in greater depth below.

In some embodiments, RCD PASSporT signing function 120 receives a request from enterprise calling party 100 or originating service provider 101 to provide verified calling party information. The verified calling party information is returned to the requesting party (e.g., the enterprise calling party or the originating service provider) by RCD PASSporT signing function 120 and can be provided in the form of a cryptographically signed RCD PASSporT that includes the verified calling party information. The signed RCD PASSporT returned by RCD PASSporT signing function 120 is then propagated downstream as part of the call flow and display confirmation service disclosed herein.

In scenarios in which RCD PASSporT signing function 120 is also communicatively coupled to the display confirmation service (DCS) 109, it is contemplated that the RCD PASSporT signing function 120 can be configured to notify or otherwise make DCS 109 aware that a new call (with a request for the display of verified calling party attributes) has been initiated. For example, in some embodiments RCD PASSporT signing function 120 can be directly integrated with DCS 109 and the DCS database (not shown) can be updated via an internal API or procedure call. In some embodiments, RCD PASSporT signing function 120 can be provided separate from DCS 109 but communicatively coupled, e.g., by a published interface that is made available by DCS 109. In some examples, the RCD PASSporT signing function 120 can be configured to return the signed RCD PASSporT (i.e., containing verified calling party information) to both the requesting party and DCS 109. For example, RCD PASSporT signing function 120 can transmit or broadcast the signed RCD PASSporT to the requesting party and DCS 109 in a simultaneous manner. It is also contemplated that RCD PASSporT signing function 120 can provide the signed RCD PASSporT to DCS 109 at some later time, e.g., after a delay or pre-defined interval.

By providing DCS 109 with the same signed RCD PASSporT that is returned to the requesting party, the DCS 109 is able to anticipate that it will receive a display confirmation request for a call associated with that signed RCD PASSporT at some point in the future. This is because the signed RCD PASSporT contains the verified calling party information that is propagated downstream as part of the call flow and ultimately utilized by terminating service provider 104 to provide a display of verified calling party information to the call recipient device 105. If RCD PASSporT signing function 120 returns a signed RCD PASSporT to only the requesting party, but not the DCS, then the DCS does not learn of the existence of a display confirmation event until the DCS receives a communication or API call from terminating service provider 104. The DCS does not begin the process of generating a display confirmation, or the process of linking a DCS request to a DCS confirmation event, until after the verified calling party information has been displayed.

As such, RCD PASSporT signing function 120 can be communicatively coupled to DCS 109 to eliminate the delay described above. Rather than reacting to a communication or API call received from terminating service provider 104, DCS 109 can proactively anticipate the receipt of a communication from terminating service provider 104 relating to a signed RCD PASSporT. In this manner, DCS 109 can subsequently generate display confirmations more expediently and more efficiently upon receipt of a communication from terminating service provider 104.

In some embodiments, the RCD PASSporT signing function 120 might return a cryptographically signed RCD PASSporT only to the requesting party (i.e., the party that invoked the RCD signing function, here either enterprise calling party 100 or originating service provider 101). In some embodiments, it is contemplated that the RCD PASSporT signing function 120 can also separately provide a copy of the signed RCD PASSporT to an out-of-band CPS (Call Placement Service) database service, e.g., CPS database 130, such that both the requesting party and the CPS database 130 receive the same signed RCD PASSporT. The copy of the signed RCD PASSporT can be provisioned to the CPS database 130 simultaneously or asynchronously with respect to the signed RCD PASSporT that is returned to the requesting party.

Provisioning the CPS database 130 with the same RCD PASSporT data can provide greater flexibility to a terminating service provider (such as terminating service provider 104), a calling party device vendor, and/or other parties and entities that may access CPS database 130. As illustrated, terminating service provider 104 is depicted as being able to access CPS database 130, although it is appreciated that various other entities and participants in call signaling and/or call establishment may additionally or alternatively be provided with access to CPS database 130 without departing from the scope of the present disclosure. For example, if an inbound call without a signed RCD PASSporT is received at the network of terminating service provider 104, then in some embodiments terminating service provider 104 can optionally query CPS database 130 in order to determine if a signed RCD PASSporT is available for the inbound call. If an appropriate or corresponding RCD PASSporT is determined to be available for the inbound call, then CPS database 130 can transmit the RCD PASSporT to the terminating service provider 104. Because the RCD PASSporT from CPS database 130 is a copy of the RCD PASSporT originally returned by RCD PASSporT signing function 120, terminating service provider 104 and the overall DCS system can subsequently utilize the CPS-provided RCD PASSporT in a similar or identical manner as they would the original RCD PASSporT returned by the signing function to the enterprise calling party/originating service provider.

There are various reasons why an RCD PASSporT may be missing from the call initiation signaling. For example, two common scenarios that can lead to missing RCD PASSporTs are: (1) SIP servers that are configured to strip SIP headers that they don't understand—such configurations can cause SIP servers to strip an SIP IDENTITY header that contains an optional RCD PASSporT; and (2) Transit networks that convert a call from SIP to legacy Time Division Multiplexing ("TDM") protocols—legacy TDM protocols cannot carry PASSporT information. As such, under both of these scenarios, a call originated by an enterprise might initially include an RCD PASSporT in the SIP signaling flow, only for the RCD PASSporT to be subsequently lost along the way as the messaging traverses multiple SIP servers and potentially multiple transit networks. Accordingly, configuring the RCD PASSporT signing function 120 to populate its RCD PASSporTs into a CPS database 130 that is available to terminating service providers can provide a useful backup mechanism for recovering lost PASSporT information. In the absence of an RCD PASSporT, a call that was originated with a request to include RCD (rich call data) will revert back to conventional telephony behavior, which typically defeats the purpose behind the originally included RCD request.

Turning next to FIG. 2, shown is an example structure of a decoded RCD PASSporT with three verified (or validated) calling party claims/attributes: nam, logo and crn (it is noted that the terms "claim" and "attribute" are used interchangeably herein with respect to rich call data). The 'nam' claim (shown here as 'Dentist Office') can be a string value representing the name of the calling party, such as enterprise calling party 100. The 'logo' claim (shown here as 'https://logo.service-provider.com/dentistlogo.jpg') can be an HTTPS link to a jpeg, other image file, or other pointer corresponding to the logo of the enterprise calling party. The logo attribute can be presented inside a flexible jCard ("jcd") JSON structure that supports multiple optional calling party attributes. The 'crn' attribute (shown here as 'Dentist Appointment Reminder') can be a string value representing the reason for a call as defined by the enterprise calling party. Other rich call data claims or attributes can be flexibly included in the RCD PASSporT structure without departing from the scope of the present disclosure. For example, the RCD PASSporT could be extended to enable an enterprise calling party to pass an HTTPS link to a promotional message to be displayed to the call recipient at time of call establishment. In another example, the RCD PASSporT could be extended to include a claim that provides a link to, or address for, an alternate means of communication that recipient can use to communicate with the enterprise. Examples of alternate forms of communication include but are not limited to, text messaging, rich communications service ("RCS"), video communications, etc.

In some embodiments, the act of an enterprise calling party or its selected originating service provider including enterprise verified calling party information with an outbound call is based on an external mechanism provided for capturing and storing verified calling party information prior to call establishment. For example, discussions are underway in both the regulatory realm and industry best practices realm to define acceptable mechanisms for verifying the identify of a calling party. The most common use case calls for each participating enterprise customer to participate in a vetting process administered by an approved vetting agency that follows industry best practices for verifying the existence of the enterprise, verifying the logo or icon used by the enterprise, and verifying the authority of the enterprise to use specific telephone number resources for outbound calls. The vetting process is expected to include a mixture of automated and manual procedures that involve upfront costs that may be passed on to the participating enterprise. The result of this upfront enterprise vetting process is a set of verified calling party attributes (e.g., calling party number(s), enterprise name, enterprise logo or icon, enterprise reason(s) for calling). Once the verified information has been captured and stored the information can be made available for including the information in the outbound calling process.

Accordingly, in some embodiments it is contemplated that each enterprise or enterprise calling party 100 pays the cost of the upfront vetting process that captures a set of verified calling party information attributes that can then be used in call establishment signaling. In some embodiments, the cost of the enterprise vetting process can be absorbed by the originating service provider 101 as part of a bundle of communications services provided to the enterprise customer.

Nevertheless, once the identity of an enterprise has been vetted and its calling party information has been verified, the information is available for use in the process of originating an outbound call. Multiple techniques are employed by enterprise calling parties for originating outbound calls to the public phone network. One common enterprise calling party call origination technique is initiating calls via a SIP call server. In one embodiment, the enterprise SIP call server can fulfill the including step (i.e., including verified calling party information 102 in the call initiation request) by invoking an RCD PASSporT signing function located inside an enterprise network associated with the enterprise calling party 100, e.g., as seen in FIG. 3.

Figure 3:
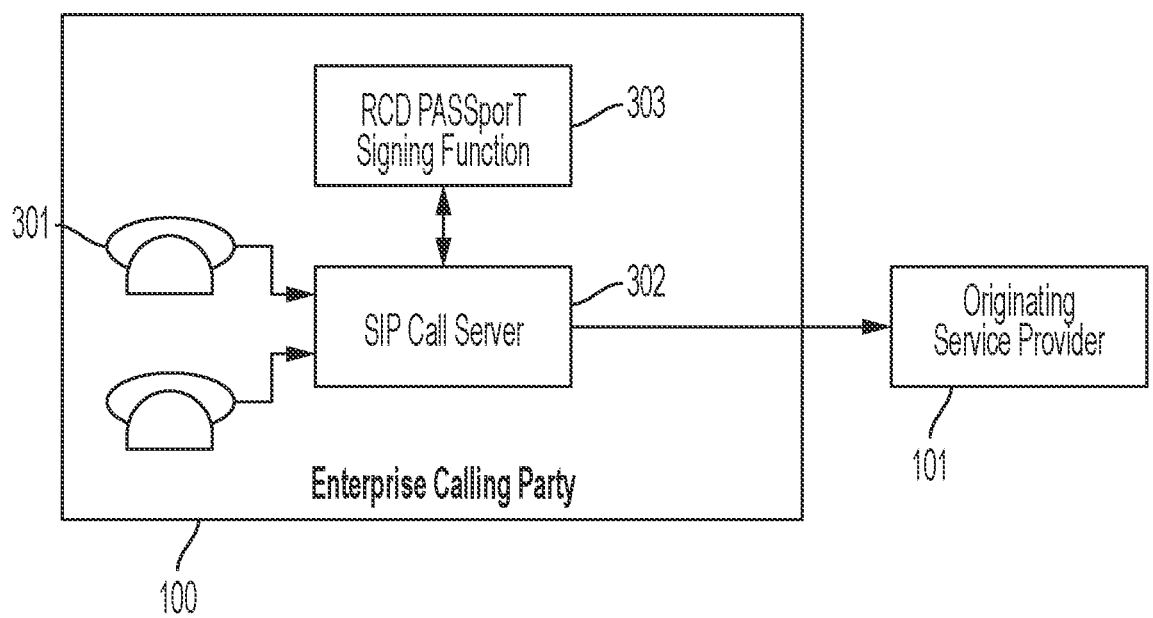
FIG. 3 is a diagram depicting an enterprise calling party initiating calls via a SIP call server connected to an originating service provider, where the SIP server includes verified calling party information in the call signaling in the form of a cryptographically signed RCD PASSporT.

FIG. 3 is an example diagram depicting an enterprise calling party 100, in which enterprise calling party 100 comprises a plurality of calling devices 301 connected to a SIP call server 302. As mentioned previously, SIP call server 302 can fulfill the step of including verified calling party information by invoking an RCD PASSporT signing function 303 before the outbound call initiation request is sent to an originating service provider 101. Commercial SIP calling servers are available from multiple vendors that have existing functionality to support invoking a STIR/SHAKEN signing function, e.g., via a SIP redirect API or via a RESTful HTTPS/JSON API.

Figure 4:
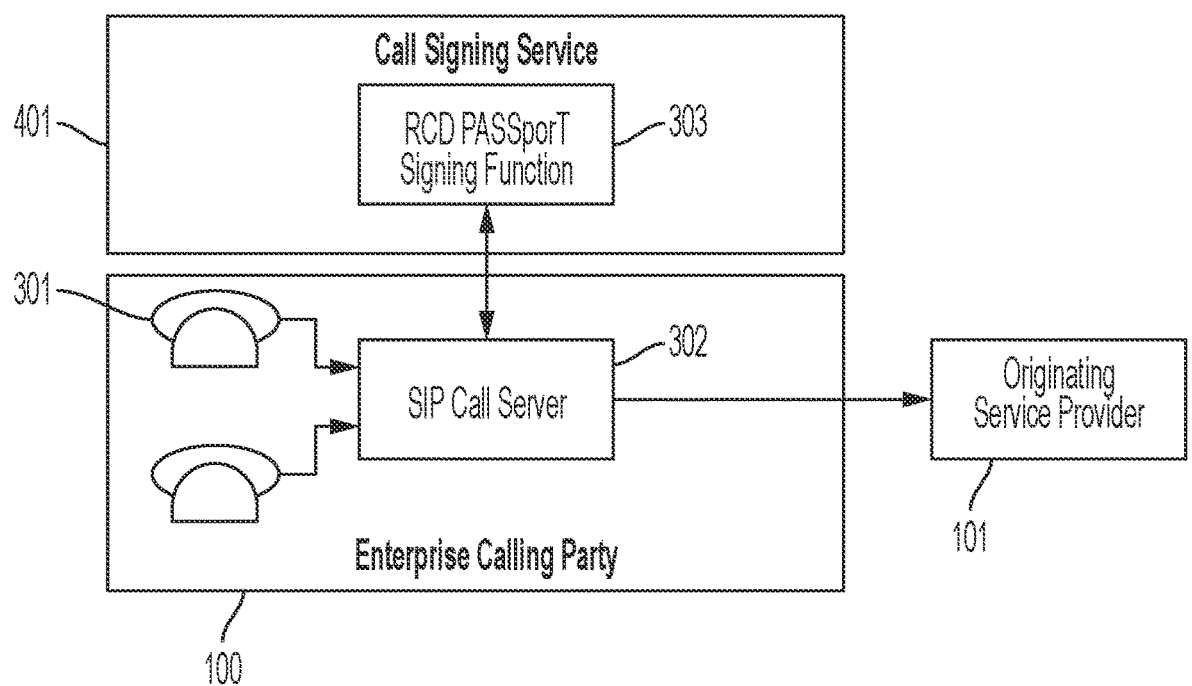
FIG. 4 is a diagram depicting an enterprise SIP server utilizing an API to access an external call signing service to obtain a signed RCD PASSporT.

In some embodiments, the SIP call server can be deployed locally within the enterprise calling party 100 network, while the RCD PASSporT signing function 303 is located outside of the local enterprise network and is hosted in a data center accessible via the public internet, for example. Such as scenario is illustrated in FIG. 4, which is a diagram illustrating an example of the RCD PASSporT signing function provided as an external service 401.

In some embodiments, the enterprise calling party 100 can utilize an SIP server located outside of its private network and provided as a hosted service that is available to multiple enterprise customers. The SIP server functionality can be the same whether it is located inside the enterprise private network or hosted outside the enterprise network. However, whether the enterprise SIP server is provided as a local SIP call server, an external SIP call server, or both, it is contemplated that the including step to combine verified calling party information 102 with the call initiation request can be accomplished by the enterprise SIP server making a RESTful HTTP/JSON API call to an RCD PASSporT signing service located outside the enterprise network and accessible via the public internet.

FIG. 5 depicts an example structure of an HTTPS/JSON POST API function call 501 to an external call signing service, shown here as being available at the domain rcd-shaken.servicecloud.com, to retrieve a cryptographically signed RCD PASSporT that is encoded and returned in the form of a SIP IDENTITY header 502. An HTTP POST message containing the calling telephone number (orig: 19785551212) and the destination telephone number (dest: 12125551111) returns a cryptographically signed RCD PASSporT that has been base64url encoded and presented in the form of an SIP IDENTITY header as per the ATIS STIR/SHAKEN standards. Note that decoding the returned SIP IDENTITY header would reveal an RCD PASSporT such as that shown in FIG. 2. However, the above description is provided for purposes of example only, and other protocols and message structures can be used when accessing an RCD PASSporT signing function without departing from the scope of the present disclosure or otherwise changing the nature and/or role of the disclosed display confirmation system. Furthermore, in some embodiments, the RCD PASSporT signing function can be deployed locally by the enterprise, and/or in some embodiments, the RCD PASSporT signing function can be integrated with the SIP call server.

Figure 6:
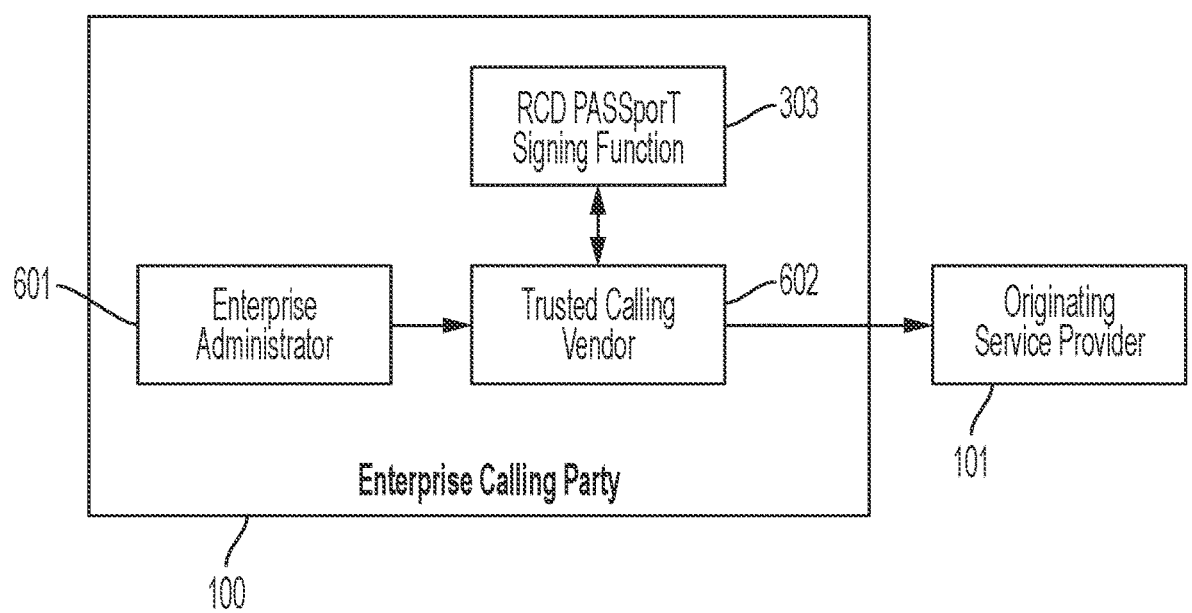
FIG. 6 is a diagram depicting an enterprise calling party initiating calls via a trusted vendor that manages outbound calling for the enterprise under contract, where the trusted vendor adds verified calling party information to the call signaling in the form of an RCD PASSporT on behalf of the enterprise customer.

Originating outbound enterprise calls can also be performed by employing a trusted business process outsourcing vendor to initiate the outbound calls under contract with the enterprise. Accordingly, in some embodiments, the including step of providing verified calling information 102 with a call initiation request can be performed by a trusted calling vendor acting on behalf of the enterprise calling party 100. FIG. 6 is a diagram illustrating one such example process, in which an enterprise calling party 100 includes an enterprise administrator 601 for contracting with a trusted calling vendor 602 that fulfills the including step by invoking an RCD PASSporT signing function (such as the RCD PASSporT signing function 303 or any other ones of the previously discussed RCD PASSporT signing functions) and then including the cryptographically signed RCD PASSporT in the outbound call initiation request sent to the originating service provider 101. An example of such a trusted vendor relationship is a call center operator originating outbound calls on behalf of an enterprise customer to support a certain calling task such as appointment confirmations, delivery notifications, school closing notifications, etc. In some embodiments, the enterprise customer can provide the trusted calling vendor 602 with a description or indication of the certain calling task associated with a given call initiation request, such that the indicated calling task can be included in the verified calling information in the RCD PASSporT.

In some embodiments, trusted calling vendor 602 can fulfill the including step on behalf of the enterprise calling party by invoking an internal RCD PASSporT signing function that is deployed locally by the trusted calling vendor. Additionally, or alternatively, trusted calling vendor 602 can fulfill the including step on behalf of the enterprise calling party by invoking an external RCD PASSporT signing function available, for example, on the internet or another interconnected network.

Figure 7:
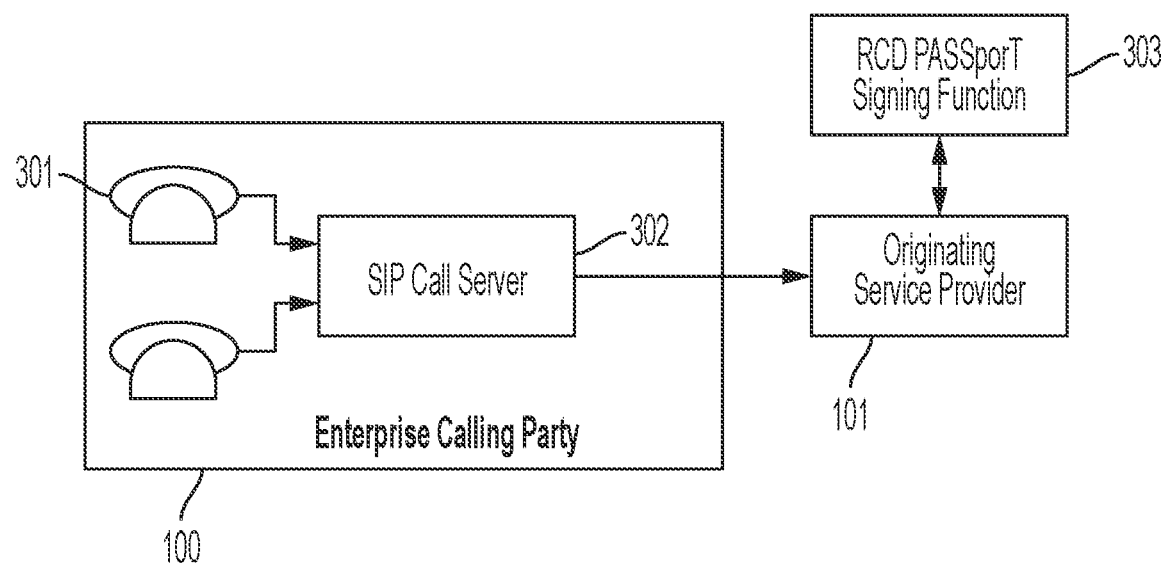
FIG. 7 is a diagram depicting an enterprise calling party initiating calls via a SIP call server connected to an originating service provider, where the originating service provider takes responsibility for adding verified calling party information to the call signaling in the form of a signed RCD PASSporT on behalf of the enterprise.

According to aspects of the present disclosure, the originating service provider can include verified calling party information in the SIP signaling on behalf of a connected enterprise calling party customer using one or more of the RCD PASSporT techniques described above. FIG. 7 is a diagram illustrating one such example scenario or configuration. As illustrated, enterprise calling party 100 comprises a plurality of calling devices 301 connected to an SIP call server 302. The enterprise SIP call server 302 initiates an outbound call by sending a call initiation request to a connected originating service provider 101. Originating service provider 101 subsequently fulfills the step of including verified calling party information on behalf of the enterprise calling party by invoking an RCD PASSporT signing function 303, either external or internal as discussed previously, before the outbound call initiation request is sent to a terminating service provider (not shown).

In some embodiments, the originating service provider 101 can fulfill the including step (of combining verified calling party information with the call initiation request) on behalf of the enterprise calling party 100 by invoking an internal RCD PASSporT signing function that is deployed locally by the originating service provider. Additionally or alternatively, the originating service provider can fulfill the including step on behalf of the enterprise calling party by invoking an external RCD PASSporT signing function available on the internet or another interconnected network.

In addition to the including step of combining verified calling party information with the call initiation request, originating service provider 101 can be further responsible for the subsequent passing step in which the verified enterprise calling party information is passed to the terminating service provider during the call establishment process (not shown here, see e.g., FIG. 1). For example, the passing step 103 can be accomplished by originating service provider 101 including both an enterprise signed RCD PASSporT and a service provider signed SHAKEN PASSporT in the SIP INVITE call initiation message that is passed to the terminating service provider.

FIG. 8 depicts an example structure of a decoded SHAKEN PASSporT. As illustrated, the SHAKEN PASSporT includes the calling-number ("orig"), the called-number ("dest"), the time of the call ("iat") and the attestation level assigned by the originating service provider ("attest"). The SHAKEN PASSporT does not include any additional verified calling party information beyond the calling number. Therefore, including the enterprise RCD PASSporT along with the SHAKEN PASSporT completes the process of passing verified enterprise calling party information to the terminating service provider.

In some embodiments, the originating service provider can combine the RCD claims (e.g., nam, logo, crn) into the SHAKEN PASSporT to thereby generate a single integrated SHAKEN PASSporT. The originating service provider can subsequently complete the passing step by passing the single integrated SHAKEN PASSporT to the terminating service provider, such that the terminating service provider receives all of the requisite or expected verified calling party information and/or attributes. For example, FIG. 9 illustrates an example structure of a decoded SHAKEN PASSporT having embedded RCD claims, and more particularly, shows the SHAKEN PASSporT of FIG. 8 extended to include the embedded RCD claims from the RCD PASSporT of FIG. 2.

In some embodiments, one or more portions or attributes of the verified calling party information (e.g., such as verified calling party information 102 and/or other verified calling party information populated into the claims of one or more RCD PASSporTs) can be stored in a database that is consulted at the time of call signing. In some embodiments, the stored verified calling party information can be provided by one or more enterprise vetting services that authenticate one or more attributes such as the identity of an enterprise and/or the enterprise's calling party information (e.g., calling TNs, calling party name, logo/icon, call reason). The database of verified calling party information attributes can be controlled and managed by the enterprise calling party, by the originating service provider, by the provider of the RCD PASSporT signing function, by the vetting agency that performed the enterprise calling party vetting process, or any combination of the above.

It is also contemplated that an enterprise calling party might choose to populate multiple versions of its verified calling party information for use by one or more RCD PASSporT signing functions. In this case, the enterprise calling party indicates to an RCD PASSporT signing function which version of its verified calling party information (or certain attributes of its verified calling party information) should be used for a particular call. For example, an enterprise can store multiple verified call reasons with an RCD PASSporT signing function where a specific one of the stores call reasons is indicated by the enterprise calling party to the RCD PASSporT signing function at the time an outbound call is initiated. In some embodiments, indication of the desired call reason can come in the form of an optional parameter passed in an HTTPS/JSON request to the RCD PASSporT signing function. It is appreciated that a same or similar concept can be applied to selection of a specific verified enterprise name (e.g., "Home Depot", "Home Depot Delivery", "Home Depot Finance"), enterprise logo or other verified enterprise calling party attribute(s) that are stored.

In some embodiments, an enterprise calling party can populate multiple versions of its verified calling party information for use by an RCD PASSporT signing function where the different versions of verified calling party information are unique to a specific individual placing an outbound call on behalf of or for the enterprise calling party. Consider for example a doctor's office placing an outbound call on behalf of one of the doctors in the practice. In such a scenario, it can be helpful to display a picture of the individual doctor placing or associated with the call rather than a generic logo of the business itself. In this case, the selection of the appropriate version of verified calling party information to include in the RCD PASSporT can be specific to the calling party telephone number (e.g., the phone number assigned to an individual placing the call on behalf of or for the enterprise calling party) and/or the selection could be based on the passing of an optional parameter in the HTTPS/JSON request to the RCD PASSporT signing function.

In an aspect of the present disclosure, phone dialer software provided on the calling party's device can be configured to allow an individual placing a call to select, in advance or in real-time, from a set of one or more verified calling party attributes to be displayed in association with a given outbound call. For example, a sole proprietor who uses his or her cell phone as a primary means of both personal and professional communication may want to designate if a call is personal or professional at the time of call origination. Accordingly, the phone dialer software on the calling party's device can populate a new parameter within an existing call signaling SIP header or populate a proprietary SIP header with instructions for the RCD PASSporT signing function. In some embodiments, the instructions passed by the calling party device can comprise an optional parameter in the SIP FROM header (e.g., display=professional, display=personal). The SIP server responsible for making an API call to the RCD PASSporT signing function would then look for the optional display parameter in the FROM header and in response, populate the correct optional parameter in the HTTPS/JSON call signing request that the SIP server submits to the RCD PASSporT signing function.

According to an aspect of the present disclosure, an enterprise calling party can dynamically pass one or more calling party attributes to an RCD PASSporT signing function at the time of call initiation. The model of dynamically passing calling party attributes at the time of call origination differs from the model of selecting from a set of predefined verified calling party attributes stored in a database that is accessed by the RCD PASSporT signing function. When dynamically passing calling party attributes, the identity of the enterprise calling party is previously authenticated and the enterprise entity is therefore trusted to pass appropriate calling party attributes at the time of call signing without requiring the use of a prestored set of options. One example of a dynamic assignment of calling party attributes would be populating the name of the individual who is placing an outbound call. Authenticating the identity of an enterprise calling party in advance of call initiation is more straightforward in comparison to authenticating the name of every individual working for a vetted enterprise entity, which may not lend itself to pre-population of a verified list of names. In some scenarios, it may be appropriate the trust the vetted enterprise entity to define its own verified calling party attributes on a call-by-call basis.

Other techniques have been discussed within various industry forums and standards groups for completing the step of passing verified calling party information between participants in the call establishment process. One alternate approach is the use of distributed ledger technology ("DLT") for exchanging verified calling party information between calling and called parties and their selected service providers. However, it is noted that methods for including and passing verified calling party information with an outbound call request can vary with evolving standards, as would be appreciated by one of ordinary skill in the art, and as such various methods for including and passing verified calling party information with an outbound call request can be utilized without departing from the scope of the present disclosure.

According to aspects of the present disclosure, the call recipient device fulfills the displaying step 106 from FIGS. 1A-B. For example, the call recipient device can fulfill the displaying step by first verify the signature contained in the RCD PASSporT to confirm that the PASSporT was signed by an approved SHAKEN entity, and to confirm that the verified calling party information contained in the PASSporT was not manipulated in transit, before presenting all or part of the verified calling party information to the call recipient.

With respect to the call recipient device(s) discussed herein, the call recipient device can be provided as a mobile computing device or smartphone running a mobile operating system (e.g., Google Android, Apple iOS) where the operating system takes responsibility for performing the displaying step in which verified calling party information is presented to a call recipient/user of the call recipient smartphone. Additionally, or alternatively, the call recipient device can be a mobile computing device or smartphone running a voice application (i.e., a voice dialer or call management application) where the voice application fulfills the displaying step. For example, the voice application can perform the displaying step by virtue of the permissions granted to the application by the operating system of the smartphone, such that the voice application can display a custom user interface that presents the verified calling party information for incoming calls. In some embodiments, the voice application can provide a UI overlay that supplements an existing incoming call interface that is provided by the smartphone operating system, e.g., wherein the UI overlay contains just the verified calling party information. One such example interface is illustrated by FIG. 17, although it is appreciated that various different configurations and architectures can be utilized to provide the voice dialer application.

In some embodiments, the voice dialer application is the default or system voice application delivered/pre-installed by the mobile operator associated with a call recipient device. In this configuration, the mobile operator can play the role of setting the policies for communication between the default voice dialer application delivered with the mobile network subscription and the DCS of the present disclosure. The DCS can be configured to support a mobile operator specific API or to support a general-purpose API utilized by many mobile operator defined voice dialer applications.

In some embodiments, the voice dialer application is selected by the mobile phone end-user or subscriber. For example, Google offers an optional voice dialer application that an end user can download for use on any mobile device running the Android operating system. In this use case, Google controls the functionality of the voice dialer application selected by the end-user and Google sets the policies for communication between the Google voice dialer application and the DCS. Similarly, other third-party developers also offer optional voice dialer and call management mobile applications that end users may download for use on any of their mobile devices that run the Android operating system—with respect to such third-party applications, the application developer can set some or all of the policies for communication between their third-party voice dialer application and the presently disclosed DCS.

To stimulate use of the DCS by mobile operators or other voice dialer application suppliers the DCS can implement custom APIs for different voice dialer applications. One application provider may wish to utilize a REST HTTPS/JSON API as described in detail in this disclosure. Another application provider may wish to utilize other protocols or features that can enable the voice application developer to create competitive advantage while using the DCS. The presently disclosed DCS is an enabling technology that can be used in creative and unique ways by different mobile network operators, different mobile device manufacturers, different mobile device operating system vendors and different voice dialer application developers to create competitive advantage. In some embodiments, one or more aspects of how the display of verified calling party information is presented to a user and then confirmed via the DCS can be unique to each service provider or vendor. For example, one voice dialer application developer may choose to distinguish between the display of verified calling party information to a user who is already engaged in another voice call versus display to a phone that is idle.

In some embodiments, the call recipient device and/or terminating service provider can be responsible for sending, to a DCS, the set of verified calling party attributes that were presented to the call recipient at the time of call establishment. For example, the sending step 108 can be accomplished by the call recipient device and/or terminating service provider sending a list of displayed attributes to the DCS using a REST HTTPS/JSON API interface made available by the DCS. REST operations are formed by combining an HTTP method (GET, POST, PUT, DELETE) with the full URI to the resource being addressed along with parameters in the request content. FIG. 10 is an example structure of a RESTful HTTP POST message with a JSON body containing a list of verified calling party attributes displayed to the call recipient at the time of call establishment. However, it is appreciated that various other protocols and message structures can be used without departing from the scope of the present disclosure or otherwise changing the nature or role of the DCS.

In some embodiments, the sending step can be performed by the voice dialer application provided on the call recipient device by using an API function call to the DCS to confirm that verified calling party information was displayed to the call recipient at the time of call establishment. In some scenarios, the voice dialer application may be the most efficient location for monitoring the display process and for sending a notification to the DCS to indicate which verified calling party information attributes were presented at the time of call establishment. However, it is appreciated that the sending step can be performed without using the voice dialer application, without departing from the scope of the present disclosure.

In some embodiments, the sending step is performed by an application running on the recipient device, separate from or combined with the voice dialer application, wherein the application monitors inbound voice calls to determine if verified calling party information was present in the call establishment signaling. In a use-case where a voice dialer application is known to reliably display verified calling party information contained in call establishment signaling, then the presence of such information in the call establishment signaling may be deemed sufficient confirmation that the information was displayed to the call recipient. In this use-case, an application running on the recipient device, separate from the voice dialer application, can fulfill the function of sending to the DCS the set of verified calling party information attributes displayed at the time of call establishment.

In some embodiments, the sending step can be performed by a network function running in the terminating service provider network. The network function monitors incoming voice signaling to look for the presence of verified calling party information in call establishment signaling. In a use-case where the voice dialer application is known to reliably display any verified calling party information contained in call establishment signaling, then the presence of such information in the call establishment signaling may be deemed sufficient confirmation that the information was displayed. In this use-case, a network function located in the terminating service provider network that monitors incoming call establishment signaling can perform the sending step by notifying the DCS when an inbound call is received that contains verified calling party information.

In scenarios in which the terminating service provider is responsible for performing the sending step to inform the DCS about the handling of verified calling party data for a particular call or call attempt (i.e., by generating and transmitting a display acknowledgement to the DCS), it is also possible for the terminating service provider to fulfill the sending step indirectly, as opposed to the direct display acknowledgement methods discussed above. For example, rather than the terminating service provider sending a display acknowledgement directly to the DCS (based on the terminating service provider's knowledge of the particular verified calling party information that it transmitted to the call recipient's device), the terminating service provider can instead (or additionally) store the display acknowledgement information/indication of verified calling party attributes transmitted to the call recipient device for display in one or more databases of call handling results. Such a configuration can provide a more seamless interaction between the DCS and the terminating service provider—when display acknowledgement information is stored in the terminating service provider's database, the DCS is able to obtain the information asynchronously, i.e., at times subsequent to when the display acknowledgement information for a particular call is first generated as a result of a call initiation request being transmitted to a call recipient device, and its contribution to potential congestion on the terminating service provider's network can be reduced.

Namely, if the terminating service provider is obligated to provide a display acknowledgement to the DCS immediately after transmitting a call initiation request that includes verified enterprise calling party attributes, this potentially doubles the load that enterprise calling party requests impose on the terminating service provider's network, as each incoming call requests now maps to two outgoing communication links on the terminating service provider network—one communication link to fulfill the call initiation request with the call recipient device, and a second communication link to provide a corresponding display acknowledgement to the DCS. Accordingly, by instead configuring the terminating service provider network to automatically log the display acknowledgement information at one or more databases, the burden that might otherwise be imposed by the additional communication load to the DCS can be alleviated.

By giving the DCS access, either directly or indirectly, to the terminating service provider's call detail record and/or call log databases, the DCS is able to flexibly implement various different retrieval strategies in a manner best suited to the needs of enterprise calling parties and/or the needs of the terminating service provider network. For example, the DCS might retrieve display acknowledgements after a certain amount of delay, or after an amount of time that is dynamically calculated based on network conditions. In some embodiments, the instantaneous retrieval of display acknowledgements from the terminating service provider database(s) can be an optional feature offered to customers or users of the DCS service. It is also possible that for the DCS to retrieve display acknowledgements in an on-demand or just-in-time fashion, i.e., where display acknowledgements are neither streamed to the DCS from the terminating service provider database nor transmitted with a delay or at periodic intervals, but are instead retrieved by the DCS from the terminating service provider database in response to a particular enterprise calling party request that necessitates the retrieval of certain ones of that enterprise calling party's display acknowledgements.

The terminating service provider database can be used to store and provide the DCS with display acknowledgements of verified enterprise rich call data (i.e., verified calling party attributes) that were displayed at the time of call establishment at a call recipient device. The terminating service provider database can additionally or alternatively be used to store and provide the DCS with call handling result information, such as whether the call went unanswered or to the call recipient's voicemail, whether the call was answered, whether the call recipient device was disconnected from the terminating service provider network, etc., as will be discussed in greater depth below.

In some embodiments, it is contemplated that the terminating service provider database can be provided as an extension or augmentation of one or more existing databases. For example, terminating service providers commonly maintain a detailed database of historical call treatment information, which contains data entries about the handling of each call that the terminating service provider has enabled or handled. Accordingly, the terminating service providers can be configured to augment their existing historical call treatment databases to also include the presently disclosed display acknowledgement information indicating which verified calling party attributes were displayed at the time of call establishment. In some embodiments, this augmentation of existing historical call treatment databases can be achieved via a DCS-provided API that integrates with the terminating service provider's existing call treatment database(s).

The terminating service provider database can take the particular form of a call detail record (CDR) database, which is used by the terminating service provider network to capture information about each call in the form of call detail records. Typical information stored in a CDR database can include, but is not limited to: calling part number, called party number, time of call, call result (e.g., ring-no-answer, routed to voicemail, answered, call duration, etc.), and destination/call recipient device type. Advantageously, at least a portion of the entries in a CDR database might already correspond to information that is included in a call initiation request as a verified calling party attribute. For example, in some embodiments the calling party number might be present in the verified calling party attributes and also stored in an existing CDR database, providing a convenient indexing or correlation mechanism with which then DCS can utilize when accessing a CDR database at a terminating service provider network.

Advantageously, as the presently disclosed DCS establishes a reporting mechanism for conveying information derived from call establishment signaling, the DCS can also be extended to include additional information beyond just the display confirmations discussed above. For example, the DCS can also collect, compile and/or analyze various call handling information and other call telemetry data obtained at the time of call establishment between the terminating service provider network and the call recipient communication device. This call handling information can provide valuable insight into the reach and impact of an enterprise's calling efforts to their users and target audience, even when considered in isolation, but particularly when considered in conjunction with the verified calling party information display confirmations. Call handling information can be provided in combination with the DCS display confirmation reports and/or in a separate fashion, configurable depending upon the particular needs or desired functionality of a given enterprise or other calling party utilizing the DCS. Accordingly, extending the presently disclosed DCS can allow enterprise calling parties to obtain greater insights with respect to their assessment(s) of the value of the phone network as a tool for reaching their customers, subscribers, and/or users.

In some embodiments, the DCS reporting mechanism can be utilized to pass call handling information relating to the outcome or end result of the call initiation request that originated from the enterprise calling party or other entity associated with the enterprise calling party. For example, although the existence of display confirmation information at the DCS can be used to infer that a call initiation request was placed, the display confirmation information alone does not indicate how that call was ultimately handled. Call handling outcomes can include a failure to establish a connection (e.g., because the destination device or call recipient device was disconnected from the destination service provider's network at the time the call was placed), being routed to the call recipient's voicemail service after a state of ring-no-answer, etc. The call handling outcomes can also include an indication of whether or not the call was answered at the call recipient device. In some embodiments, when a call is answered, the corresponding call handling data can further include call telemetry data indicating a duration of the call, a start and/or end time of the call, whether or not the call was dropped or disconnected, which party terminated the call, etc.

Independent of the specific mix of call handling outcome information and/or call telemetry data that are utilized, it is contemplated that the destination service provider (also referred to herein as the terminating service provider/terminating service provider network) can pass the requisite information back to the DCS, either concurrent with the destination service provider's establishment of the call between the enterprise calling party and the call recipient device, or immediately thereafter. In order to provide this information to the DCS, the destination service provider can utilize the same communication path that it uses (or used) to transmit a display acknowledgement for the same call back to the DCS. In some embodiments, rather than being actively transmitted to the DCS by the destination service provider or destination service provider network, one or more portions of the call handling information and call telemetry data can be automatically logged and stored at a database either within the destination service provider network or communicatively coupled to the destination service provider network, such that the DCS can at a later time access and retrieve the call handling information and call telemetry data stored on the database. When the destination service provider utilizes one or more databases to log and store call handling information, the DCS can obtain the call handling information on a push basis (new entries of call handling information are forwarded to the DCS as they are written to the database, or are forwarded to the DCS at some pre-determined interval), a pull basis (the DCS periodically requests any new/updated call handling information from the destination service provider's database), or any combination of the two.

Separate from the manner in which the sending step occurs, the choice of which verified calling party information attributes to include in the call establishment signaling is determined by the enterprise calling party. In some embodiments, the enterprise calling party can work with a company that provides both enterprise vetting services as well as the RCD PASSporT signing function to manage the process of vetting the enterprise identity, verifying the enterprise calling party information and making the information available in call establishment signaling through an RCD PASSporT signing function.

It is also possible that the same verified calling party information is included in every outbound call from a given enterprise calling party, e.g., as such a configuration can reduce complexity, possible failure points and/or overhead costs.

In some embodiments, the RCD PASSporT signing function can be designed to implement service logic whereby different verified calling party attributes are included in different calls based on one or more parameters defined by the enterprise calling party.

In some embodiments, the RCD PASSporT signing function is configured to limit the set of verified calling party attributes included in call signaling based on analysis of the dialed digits. For example, analysis of the dialed digits may indicate that the call recipient is using a landline phone device that is only capable of displaying a simple 15-character name so there is no benefit in including additional verified calling party attributes in the call signaling in this use-case.

In an aspect of the present disclosure, the call recipient device may be configured to store a local copy of verified calling party information received from frequent callers. Frequent calls are often exchanged between members of a community, or between enterprises and members of a community. Examples include a community of employees receiving frequent calls from their employer, or a community of students receiving calls from their school, or a community of friends or family. In the case where a call recipient device is receiving repeat calls from one or more calling parties it can be efficient to cache all or a part of the verified calling party information. For example, the cache could be a local cache in the onboard memory/storage of the call recipient device. In some embodiments, the cache could be managed by the voice dialer application running on the call recipient device and/or could be remotely managed by the DCS. One example is caching the picture or logo file from a common calling party to avoid the delay and cost associated with retrieving the picture or logo file for every inbound call. In some embodiments, the act of storing a local copy of verified calling party information associated with frequent callers can be performed by a network element in the terminating service provider's network. Using the same example of caching the picture or logo file for a frequent caller, the cached file can be stored in a network element within the terminating service provider network where the information is available to all calling party devices served by the terminating service provider.

It is contemplated that the DCS can be configured to collect, store, and make available for review, evidence of the display of verified enterprise calling party information to a call recipient at the time of call establishment. It is appreciated that multiple deployment and security options are possible for the DCS. In some embodiments, the DCS is implemented as a web service. Web services can include services offered by an electronic device to another electronic device, e.g., communicating with each other via the internet; or a server running on a computer device, listening for requests at a particular port over a network, serving web documents (HTML, JSON, XML, images), and creating web applications services, which serve in solving specific domain problems. In a web service a web technology such as HTTP can be used for transferring machine-readable file formats such as XML and JSON.

Figure 11:
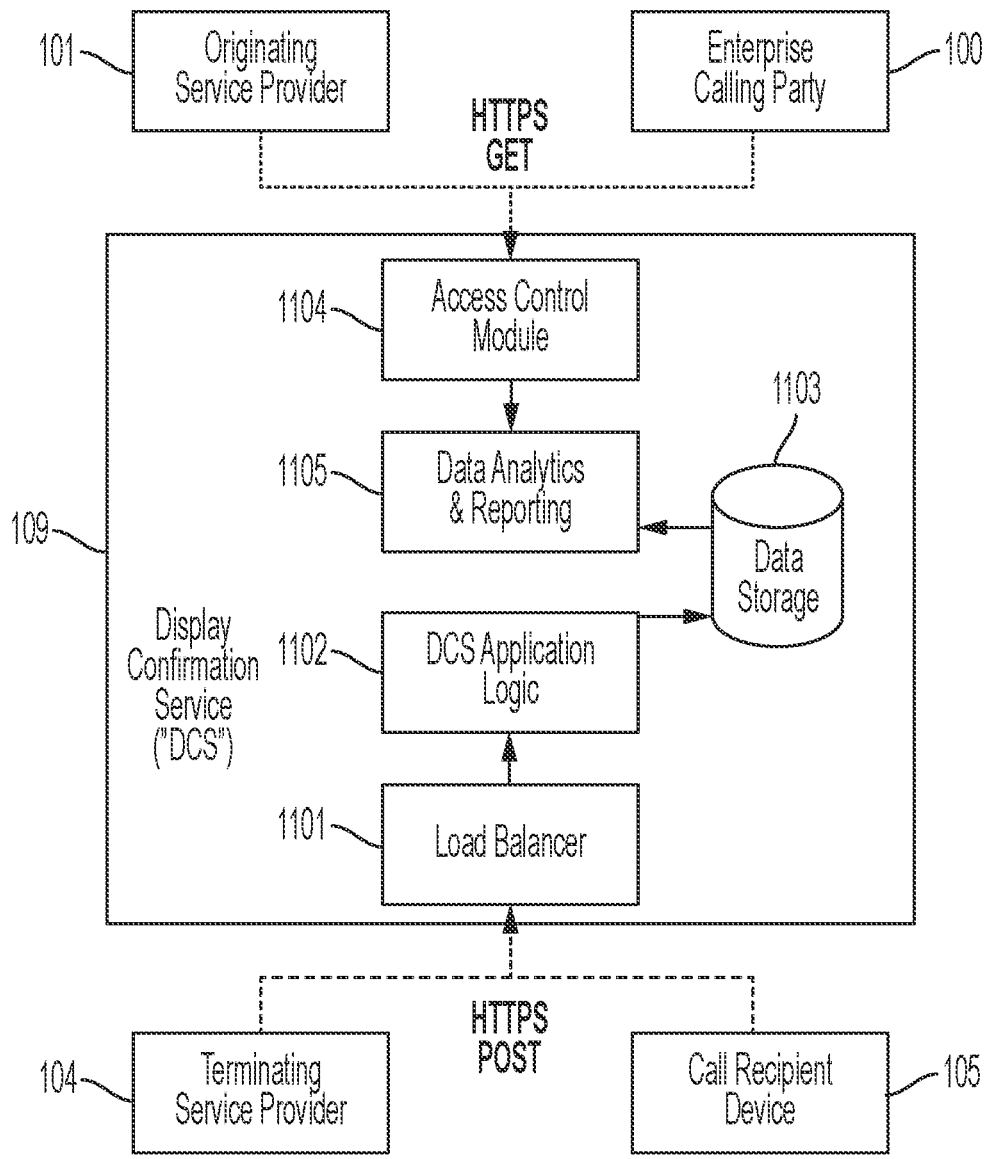
FIG. 11 is a diagram depicting an example display confirmation service in the form of a web service with an HTTPS/JSON POST interface for provisioning and an HTTPS/JSON GET interface for reporting.

In instances in which the DCS is implemented as a web service, the DCS can more particularly be implemented within a cloud infrastructure such as Amazon Web Services ("AWS"). FIG. 11 is a diagram illustrating an example internal structure and components of a display confirmation service (DCS) 109 that is implemented as a web service. Multiple terminating service providers and call recipient devices can connect to the DCS 109 via a load balancing function 1101. Updates to the DCS are provided via an HTTPS/JSON POST API. DCS updates are received and processed via the DCS Application Logic module 1102 before being stored in the DCS database 1103 where the data is indexed for efficient reporting. Originating service providers 101 and enterprise calling parties 100 connect to DCS 109 via an access control module 1104 that limits access to the analytics and reporting module 1105 to participating entities only. Originating service providers and enterprise calling parties can download usage reports from the DCS via an HTTPS/JSON GET API.

Figure 12:
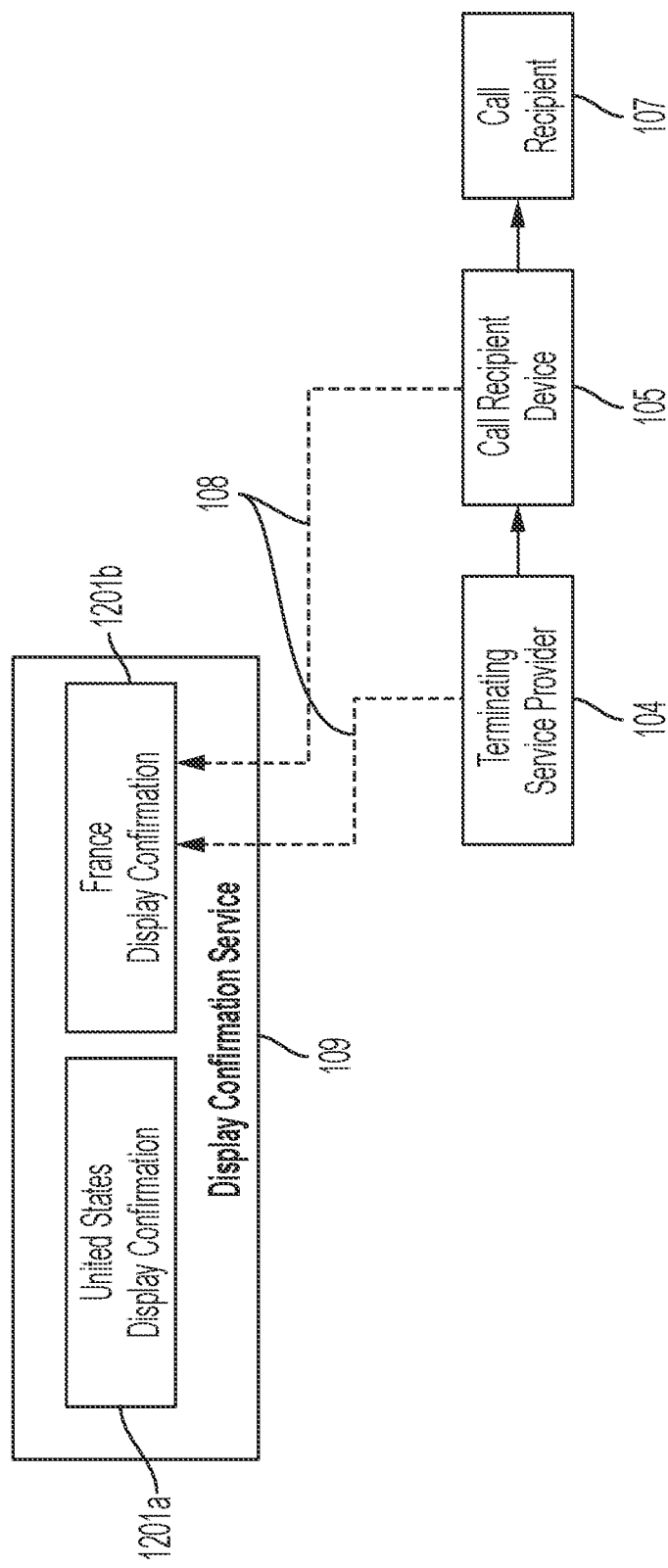
FIG. 12 is a diagram depicting an example display confirmation service with country specific services.

In some embodiments, the DCS is a web service on the public internet that is available to all call recipient devices and all terminating service providers. In some embodiments, the DCS is decomposed into country specific services where the selection of the correct display confirmation service is based on the country-code of the call recipient telephone number. FIG. 12 is a diagram depicting an example DCS in which country specific services 1201 operate independently (e.g., United States DCS 1201*a*, France DCS 1201*b*). In this scenario, the call recipient device 105 or terminating service provider 104 is responsible for connecting to or communicating with the correct country specific service, e.g., based on an analysis of the country-code of the called party telephone number.

In some embodiments, the DCS is terminating service provider specific where the address of the correct DCS instance is specific to the terminating service provider serving the call recipient.

Figure 13:
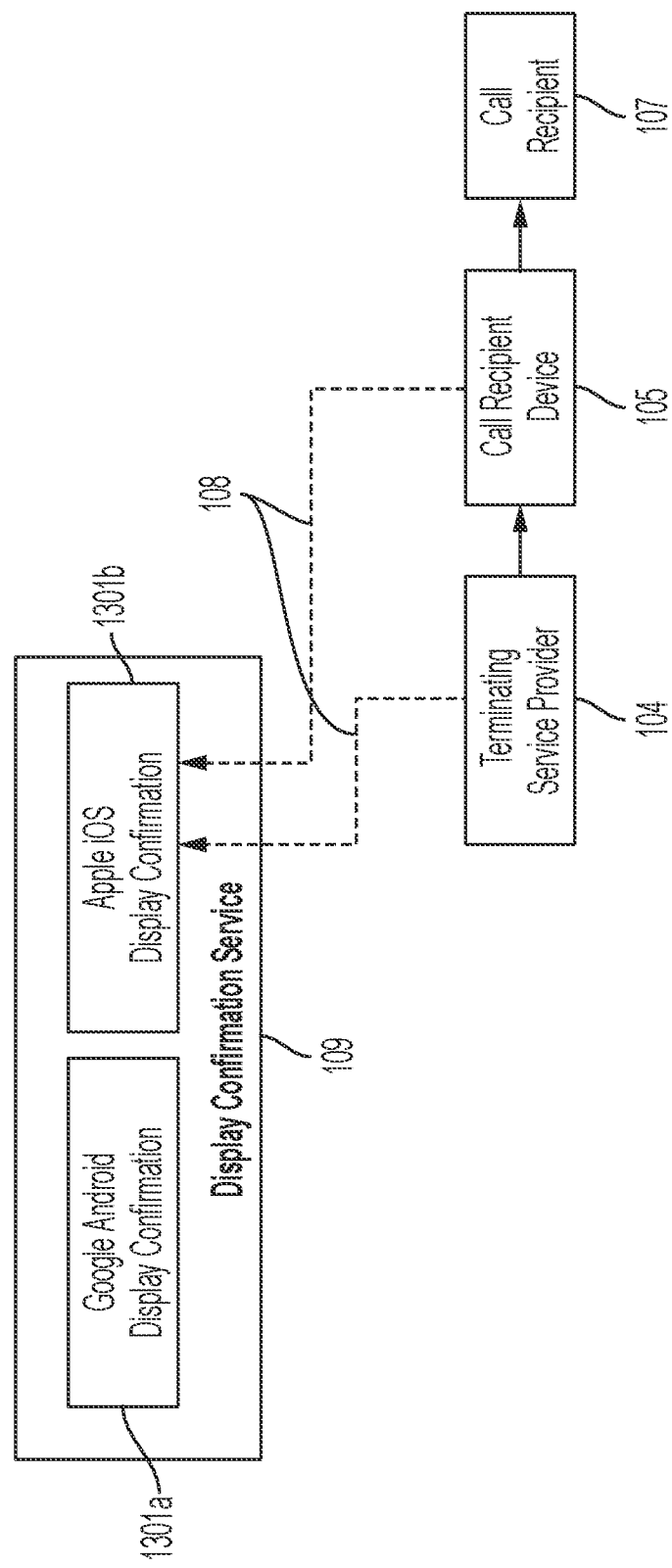
FIG. 13 is a diagram depicting an example display confirmation service with services specific to an operating system (e.g., Android, iOS) used by a call recipient device.

In some embodiments, the DCS is selected by the operating system of the call recipient device. For example, a call recipient device that utilize the Google Android operating system could update a DCS service reserved for call recipient devices that utilize the Google Android operating system. FIG. 13 is a diagram illustrating an example of a display confirmation service 109 where operating system specific confirmation services 1301 operate independently (e.g., Google Android DCS 1301*a*, Apple iOS DCS 1301*b*). Similar to the example of FIG. 12, here the call recipient device 105 or terminating service provider 104 is responsible for connecting to or communicating with to the correct operating system specific service 1301, e.g., based on an analysis of the operating system used by the call recipient device.

In some embodiments, the location and address of the DCS is defined by the manufacturer of the call recipient device. For example, a call recipient device manufactured by Samsung would update a DCS instance reserved for call recipient devices manufactured by Samsung. It is also appreciated that the DCS can be a combination of multiple components, including but not limited to country specific services, terminating service provider specific services, call recipient device operating system specific services, etc.

Figure 14:
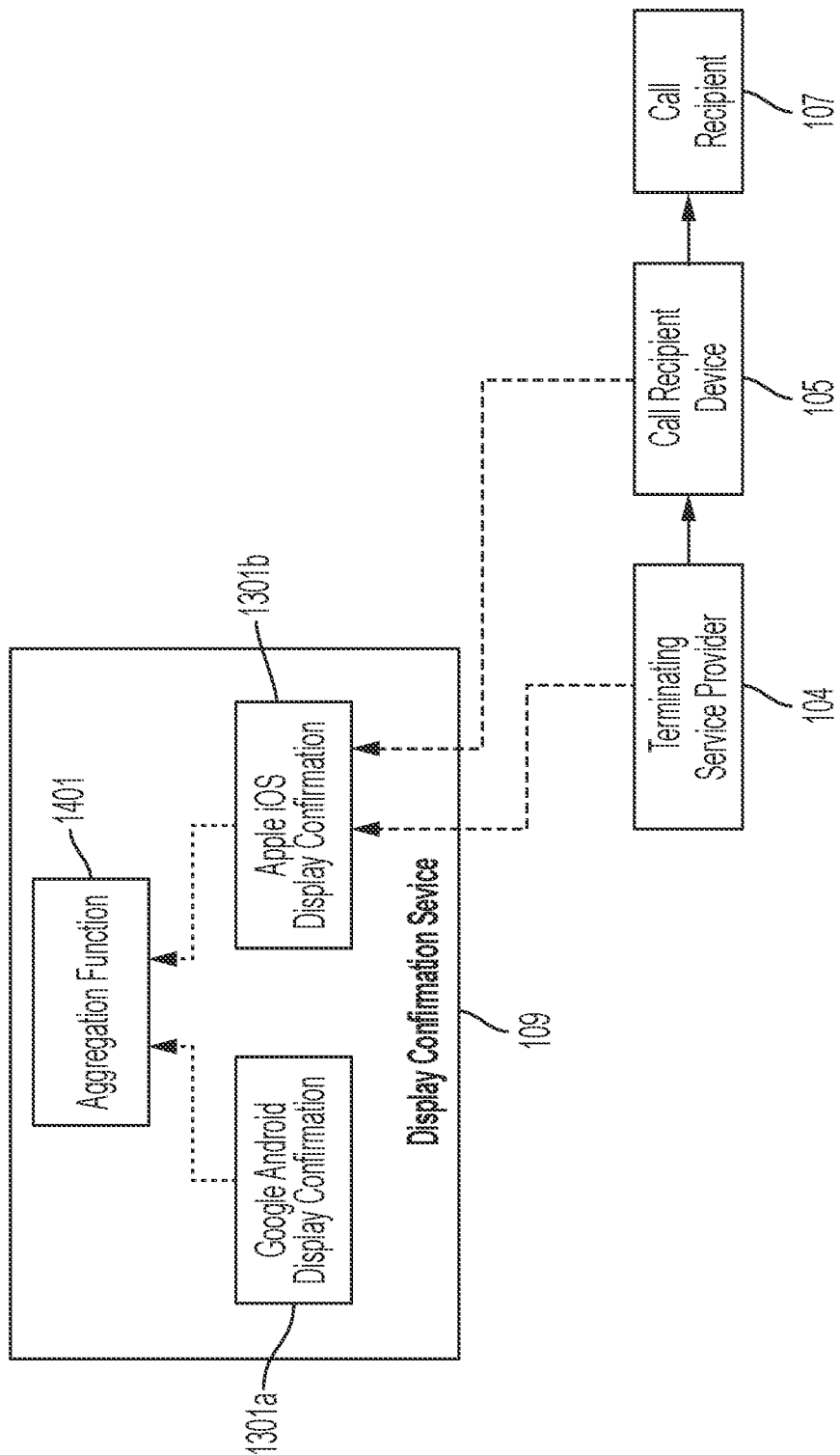
FIG. 14 is a diagram depicting an example display confirmation service that includes an aggregation function for assembling display confirmation information from multiple country specific or operating system specific services.
Figure 16:
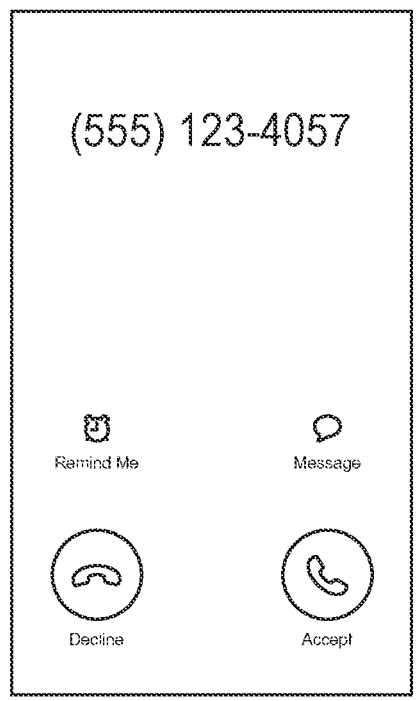
FIG. 16 depicts an example of a call display without verified calling party information.

In some embodiments, the DCS includes a data aggregation function where the information contained in multiple country-specific or operating system specific services is aggregated. Aggregating the data from the multiple independent services simplifies the presentation of information back to the enterprise calling party or its connected originating service provider. FIG. 14 is a diagram illustrating an example of a DCS in which the information contained in multiple operating system specific services is collected by an aggregation function 1401. The entity operating the DCS aggregation function 1401 can be the same entity that operates the DCS 109, thereby further simplifying the presentation of information back to the enterprise calling party and/or its connected originating service provider.

In some embodiments, the DCS data aggregation function 1401 is operated by a first entity while the DCS 109 is operated by a different entity or set of entities. For example, it may be the case that each voice dialer application developer, each call recipient device operating system vendor or each terminating service provider deploys and runs its own version of the DCS service where each independent version of the DCS forwards its database to a common aggregation function operated by another entity. For example, the common aggregation function could be operated by a distributed DCS management entity (not shown) or could be operated by a given DCS that is configured to operate as a centralized DCS.

The data collected by the DCS and its aggregation function can be useful to multiple parties that play a role in the call establishment process. The set of data elements captured by the DCS is likely to grow over time as different uses are identified for the data. In addition to receiving and storing the list of verified calling party information attributes displayed at the time of a call, the DCS can also play a role in receiving and storing additional user data. The set of user data attributes captured by the DCS includes but is not limited to: calling party number, called party number, date and/or time of the call, originating service provider ID, terminating service provider ID, call recipient device operating system type and version, call recipient device voice application type and version, call recipient device hardware type and version.

According to an aspect of the present disclosure, the enterprise calling party can use the data collected by the DCS to verify if a higher percentage of its outbound calls are being answered when verified calling party information is displayed to the call recipient. In one embodiment, the enterprise calling party can be identified in the DCS database by its calling party telephone number. The enterprise calling party might also be identified in the DCS database by the unique serial number of the X.509 certificate used to sign the enterprise RCD PASSporTs, or by the organization name contained in the X.509 certificate used to sign the RCD PASSporT.

In some embodiments, one or more of the originating service provider, the terminating service provider, the DCS operator, or other entity in the system, can use information contained in the DCS database to charge fees to various enterprise calling parties for the successful display of verified calling party information. Such fees can be implemented on a per-call basis or as a monthly fee covering all outbound calls from a given enterprise calling party, etc. The entity providing the RCD PASSporT signing function might also use information contained in the DCS database to charge one or more fees to the enterprise (or other participating parties or entities) for the successful display of verified calling party information to the ultimate call recipient.

As such, it is contemplated that multiple entities in the call establishment process may charge fees for their role in the display of verified calling party information. For example, a terminating service provider can be paid a fee for the successful and confirmed display of verified calling party information to a call recipient. Similarly, a call recipient device operating system vendor can be paid a fee for each call that it presents to a call recipient with the display of verified calling party information. Additionally, one or more of a terminating service provider, a call recipient device operating system vendor, and or a call recipient device manufacturer can be paid a fee for each call that is presented to a call recipient with the display of verified calling party information.

In some embodiments, the enterprise calling party can authorize the display of verified calling information for all calls originating from specific calling party telephone numbers and/or authorize the display of verified calling party information only for specific calls on a case-by-case basis. Enterprise customers that are charged a fee for successful display of verified calling party information may want an option to pre-approve the display of verified calling party information for certain use cases. In such scenarios, the enterprise calling party could authorize the display of verified calling party information for its outbound voice calls and/or could refuse the display of verified calling party information for its outbound voice calls. Greater granularity can also be provided, wherein the enterprise calling party can request a specific type or manner with which enterprise calling party attributes are to be displayed. For example, the enterprise calling party can specify, or configure at the DCS, a set of different conditions or triggers that, when met, result in a desired set or configuration of verified calling enterprise calling party attributes being transmitted alongside the enterprise's call initiation request.

For example, under the same scenario in which an enterprise customer is charged a fee for successful display of their verified calling party information (either by the DCS and/or the terminating service provider), then the enterprise might want to identify the individual calls it places that are to receive enhanced display via inclusion of the verified calling party attributes, so as to optimize its expenditures and/or only include verified calling party attributes for high value calls or other calls where inclusion is deemed necessary or desirable. In some embodiments, the enterprise calling party can be provided with the granularity to only select or request the enhanced display option provided by the presently disclosed DCS system based on factors such as originating number (e.g., always request enhanced display for calls placed by certain numbers), call origination location (e.g., always request enhanced display for some offices, locations, departments, etc. that are a part of the enterprise, but not for others), destination service provider, call recipient number, call recipient communication device, call reason, etc.

The enterprise calling party can also request the display of verified calling party information by passing such a request to an RCD PASSporT signing function at the time of call establishment. This allows the enterprise calling party to select an option for enhanced display on a call-by-call basis, at any time up until the RCD PASSporT signing function is invoked in conjunction with the call initiation request being generated or first transmitted. When an enterprise calling party wants its verified enterprise calling party information to be displayed, the RCD PASSporT signing function includes RCD claims in the RCD PASSporT at the time of call signing. When an enterprise calling party does not want its verified enterprise calling party information to be displayed, the RCD PASSporT signing function generates an RCD PASSporT without including the RCD claims.

However, the RCD PASSporT JSON structure mandates that at least the nam (i.e., enterprise name) claim must be included in an RCD PASSporT. Accordingly, if it is determined that an enterprise calling party does not want verified calling party information included with a specific call, then the RCD PASSporT signing function can populate the nam attribute with a default value (e.g., Enterprise Caller), or with a null/empty value, that does not reveal any verified calling party information that is specific to the enterprise calling party.

In some embodiments, when an enterprise calling party does not want its verified enterprise calling party information to be displayed then the RCD PASSporT signing function can generate a base PASSporT instead of an RCD PASSporT. See, for example, FIG. 15 which provides an example structure of a base PASSporT that identifies the calling party telephone number (i.e., orig) and the destination telephone number (i.e., dest) but it does not include any verified calling party attributes (e.g., nam, logo, crn). Including a cryptographically signed RCD PASSporT, without any RCD claims, or including a cryptographically signed Base PASSporT (also without any RCD claims), is still potentially useful to both originating service providers and terminating service providers. For example, the originating service provider can use the signed enterprise PASSporT (RCD PASSporT or Base PASSporT) to verify the identity of the call originator; the terminating service provider can use the signed enterprise PASSporT as evidence that a specific enterprise calling party was not willing to pay the fee for enhanced display services as offered by the terminating service provider. Such evidence can provide valuable feedback to the terminating service provider to inform decision regarding how such value-added services should be priced to best stimulate enterprise adoption.

In some embodiments, the API call to the RCD PASSporT signing function includes an option for an enterprise calling party to include, or not include rich call data in the signed PASSporT for a specific call. The ability to include, or not include RCD attributes on a call-by-call basis gives the enterprise total control over the signing process.

In some embodiments, the DCS can be configured to provide one or more automated settlement functions and/or services between some (or all) of the entities that participate in the call flow process, including any of the entities previously described herein. Given its centralized nature and its multiple communicative couplings, in many scenarios the DCS is well positioned in the call-flow to provide these automated settlement functions. For example, automated settlement functions can be provided on behalf of calling-parties (who may want to pay for confirmed enhanced display services), terminating service providers and device vendors (who may want to charge for the role they play in delivery of confirmed enhanced display services), etc.

In one example, the DCS can perform an automated settlement function wherein enterprise calling parties provide advanced funding and maintain a balance in an account at the DCS—the DCS can then charge an enterprise calling party's pre-paid account as the enterprise calling party utilizes confirmed enhanced display services provided by the DCS. The enterprise calling party's account can be drawn from in substantially real-time, e.g., after each use of a confirmed enhanced display service. The enterprise calling party's account may also be drawn from at some settlement interval, e.g., daily, weekly, etc. In scenarios in which the DCS draws from accounts at a regular settlement interval rather than in real-time, a running total charge amount can be calculated in order to prevent parties from utilizing the confirmed enhanced display services of the DCS beyond their account balance.

Described below is one example of a scenario in which the DCS implements automated settlement. It is appreciated that this example is provided for purposes of illustrating and is not intended to be construed as limiting. In one example scenario, participating enterprises pre-fund their DCS account and then consume the pre-funded balance on a call-by-call basis, in which enhanced display is requested by the calling party and then subsequently confirmed by the terminating service provider or calling party device vendor. In some embodiments, DCS-based automated settlement can be performed by communicatively linking the DCS to the RCD PASSporT signing function(s), such that when an RCD PASSporT signing function receives a request from an enterprise (or other requesting party), the RCD PASSporT signing function returns a signed RCD PASSporT to both the requesting party and the DCS. The DCS can store the received signed RCD PASSporTs as indicative of a particular request for enhanced display, and later link a display confirmation (e.g., received from a terminating service provider) to a matching request, e.g., on the basis of the signed RCD PASSporT. Under this arrangement of automated settlement via the DCS, the calling party can benefit by knowing that they will only be charged a fee if enhanced display is first requested and then subsequently confirmed—if either the request or the confirmation is missing, then the DCS will not deduct funds from the enterprise pre-funded account. Additionally, terminating service providers can benefit by receiving automatic funds transfers from the DCS, e.g., in response to the terminating service provider confirming the delivery of enhanced display services requested by an enterprise. Moreover, automated settlement services provided by the DCS can enable any number of enterprise calling parties to consume enhanced display services, offered by any number of terminating service providers or device vendors, without the need for either of the two participating parties to ever establish a direct billing relationship with, communicate with, or even be aware of the identity of their counterparty to the transaction.

Advantageously, after being deployed, the presently disclosed DCS can be used to confirm the display of verified calling party information from both industry standard solutions like STIR/SHAKEN as well as from company specific proprietary solutions, thereby offering greater flexibility in backend implementation that can potentially drive greater adoption by both calling parties and call recipients. As first mentioned with respect to FIGS. 1A-B, the present disclosure provides systems and methods for secure call establishment to mitigate fraudulent calls, an accomplishment that stands to benefit both call recipients and calling parties alike.

Although the foregoing disclosure has described how the including, passing, and displaying steps can be accomplished within a standardized STIR/SHAKEN framework, it is appreciated that the STIR/SHAKEN framework is used for purposes of illustration and example and is not intended to be construed as limiting the scope of the disclosure. As previously mentioned, these same and other steps can be accomplished through integration with company specific proprietary solutions or otherwise without requiring use of the STIR/SHAKEN framework. It is appreciated that the final step of confirming via a display confirmation service can be performed under both the standardized STIR/SHAKEN model as well as under other models and/or frameworks. The confirmation of the display of verified calling party information is, in some respects, the most visible output of the presently disclosed DCS—enterprise calling parties will want to know if their verified calling party information was displayed to the call recipient regardless of how the including, passing and displaying steps were performed in the backend. The final step of sending to a display confirmation service a list of verified calling party information attributes displayed to a call recipient at time of call establishment is needed regardless of how the including, passing and displaying steps are accomplished. Advantageously, the presently disclosed DCS allows a mixture of standardized solutions and proprietary solutions to coexist and add value to the public and other telephone networks.

What is claimed is:

1. A method for providing display confirmation of verified calling party information to a calling party by a display confirmation service ("DCS"), the method comprising:
    receiving, by the DCS, a set of verified calling party attributes corresponding to a call initiation request from the calling party,
    wherein a subset of the verified calling party attributes are provided for display on a communication device associated with a call recipient identified by the call initiation request, wherein the subset comprises some or all of verified calling party attributes of the set of verified calling party attributes;
    obtaining, by the DCS, responsive to provision of the subset of verified calling party attributes for display on the communication device, a display acknowledgement comprising a listing of verified calling party attributes recorded as being displayed during establishment of a communication session between the calling party and the call recipient; and
    validating, by the DCS, the display acknowledgement; and
    generating, by the DCS for provision to the calling party, a display confirmation of verified calling party attributes that were successfully displayed at the communication device associated with the call recipient during establishment of the communication session.

2. The method of claim 1, wherein the set of verified calling party attributes includes one or more of a calling party name, a calling party logo, a calling party image, and a call reason indicating a purpose of the call initiation request.

3. The method of claim 1, wherein:
    the set of verified calling party attributes is received in an IDENTITY header of an SIP (Session Initiation Protocol) INVITE call establishment message; and one or more verified calling party attributes of the set of verified calling party attributes comprise Rich Call Data (RCD) claims.

4. The method of claim 1, wherein the set of verified calling party attributes is cryptographically signed with a cryptographic signature comprising one or more of a calling party signature, an originating service provider signature, and a contracted party signature, the contracted party signature corresponding to a vendor or third-party provider representing the calling party.

5. The method of claim 4, wherein the cryptographic signature is used to sign an RCD (Rich Call Data) PASSporT (Personal Assertion Token) containing the set of verified calling party attributes or the subset of verified calling party attributes.

6. The method of claim 5, wherein the RCD PASSporT is generated in response to passing one or more selection parameters to an RCD PASSporT signing function, the selection parameters identifying one or more pre-determined verified calling party attributes for inclusion in the RCD PASSporT.

7. The method of claim 6, where the selection parameters identify a desired version of pre-defined calling party attributes for inclusion in the RCD PASSporT.

8. The method of claim 4, wherein the cryptographic signature is used to sign a SHAKEN (Signature-based Handling of Asserted Information using toKENs) PASSporT containing the set of verified calling party attributes or the subset of verified calling party attributes.

9. The method of claim 1, further comprising:
transmitting the subset of verified calling party attributes to a termination service provider for provision to the communication device associated with the call recipient to cause:
display, on a user interface of the communication device, one or more verified calling attributes of the subset of verified calling party attributes; and
generation of the display acknowledgement to include each of the one or more verified calling attributes displayed on the user interface of the communication device.

10. The method of claim 1, wherein the display acknowledgement is generated by one or more of: a terminating service provider associated with the call recipient or the communication device associated with the call recipient.

11. The method of claim 1, wherein the display acknowledgement comprises an HTTPS/JSON POST message.

12. The method of claim 1, wherein generating the display acknowledgement is based at least in part on accessing one or more call detail record (CDR) databases associated with a terminating service provider network that transmitted the subset of verified calling party attributes to the communication device associated with the call recipient.

13. The method of claim 1, further comprising obtaining the display acknowledgement to include call handling data associated with the establishment of the communication session between the calling party and the call recipient, the call handling data including one or more of:
an indication that the call recipient communication device was disconnected from a terminating service provider network at a time of attempted establishment of the communication session;
an indication that the communication session was routed to a voicemail service of the call recipient communication device; and
an indication that the call recipient communication device accepted the communication session.

14. The method of claim 1, further comprising:
generating, by the DCS, the subset of verified calling party attributes based at least in part on display capability properties of the communication device associated with the call recipient, wherein:
a given verified calling party attribute is excluded from the subset for display on the communication device in response to a determination that the given verified calling party attribute is incompatible with the display capability properties of the communication device.

15. The method of claim 2, further comprising:
retrieving, by the DCS, the calling party image from a database storing a plurality of pre-vetted calling party images, wherein the calling party image is retrieved based on one or more of a calling party telephone number indicated by the call initiation request and the calling party name; and
concatenating, by the DCS, the retrieved calling party image to the subset of verified calling party attributes, prior to providing the subset of verified calling party attributes for display on the call recipient communication device.

16. A system for providing display confirmation of verified calling party information to a calling party by a display confirmation service ("DCS"), the system comprising:
a display confirmation service (DCS) communicatively coupled to a terminating service provider network and a call recipient communication device, wherein:
the terminating service provider network is configured to receive a call initiation request corresponding to a calling party and including a set of verified calling party attributes,
the call recipient communication device is associated with a call recipient identified by the call initiation request and is configured to receive a subset of the verified calling party attributes from the terminating service provider network,
the DCS is configured to:
obtain a display acknowledgement comprising a listing of verified calling party attributes recorded as being displayed during establishment of a communication session between the calling party and the call recipient;
validate the display acknowledgement; and
generate, based at least in part on the validation, a display confirmation of verified calling party attributes determined as being successfully displayed at the communication device associated with the call recipient during establishment of the communication session.

17. The system of claim 16, wherein the set of verified calling party attributes includes one or more of a calling party name, a calling party logo, a calling party image, and a call reason indicating a purpose of the call initiation request.

18. The system of claim 16, further comprising an RCD (Rich Call Data) PASSporT (Personal Assertion Token) signing function, wherein the RCD PASSporT signing function:
receives the set of verified calling party attributes in a request from the calling party; and
generates an RCD PASSporT having a cryptographic signature corresponding to the calling party and containing the set of verified calling party attributes as an RCD payload.

19. The system of claim 16, further comprising an RCD (Rich Call Data) PASSporT (Personal Assertion Token) signing function, wherein the RCD PASSporT signing function:

receives the set of verified calling party attributes in a request transmitted from an originating service provider network associated with the calling party; and generates an RCD PASSporT having a cryptographic signature corresponding to the calling party and containing the set of verified calling party attributes as an RCD payload.

20. The system of claim 19, wherein the RCD PASSporT signing function generates the RCD PASSporT in response to being passed one or more selection parameters, the selection parameters identifying at least a first pre-determined verified calling party attribute for inclusion in the RCD PASSporT.

21. The system of claim 16, wherein:

the set of verified calling party attributes is received in an IDENTITY header of an SIP (Session Initiation Protocol) INVITE call establishment message; and one or more verified calling party attributes of the set of verified calling party attributes comprise Rich Call Data (RCD) claims.

22. The system of claim 16, wherein the set of verified calling party attributes is cryptographically signed with a cryptographic signature prior to being received by the terminating service provider network, the cryptographic signature comprising one or more of:

a calling party signature;

an originating service provider signature; and a contracted party signature, the contracted party signature corresponding to a vendor or third-party provider representing the calling party.

23. The system of claim 22, wherein the originating service provider signature is used to sign a SHAKEN (Signature-based Handling of Asserted Information using toKENs) PASSporT containing the set of verified calling party attributes or the subset of verified calling party attributes.

24. The system of claim 16, wherein the DCS is configured to obtain the display acknowledgement from the call recipient communication device, the display acknowledgement generated by the call recipient communication device to include each of the subset of the verified calling attributes displayed on a user interface of the communication device.

25. The system of claim 16, wherein the DCS is configured to obtain the display acknowledgement from the terminating service provider, the display acknowledgement comprising a listing of verified calling party attributes transmitted to the call recipient communication device by the terminating service provider.

26. The system of claim 16, wherein the display acknowledgement comprises an HTTPS/JSON POST message.

27. The system of claim 16, wherein the DCS obtains the display acknowledgement by accessing one or more call detail record (CDR) databases associated with the terminating service provider network.

28. The system of claim 16, wherein the DCS further receives call handling data associated with the establishment of the communication session between the calling party and the call recipient, the call handling data including one or more of:

an indication that the call recipient communication device was disconnected from the terminating service provider network at a time of attempted establishment of the communication session;

an indication that the communication session was routed to a voicemail service of the call recipient communication device; and an indication that the call recipient communication device accepted the communication session.

29. The system of claim 16, wherein the subset of verified calling party attributes received by the call recipient communication device is generated based at least in part on one or more display capabilities of the call recipient communication device, such that a given verified calling party attribute is excluded from the subset in response to a determination that the given verified calling party attribute is incompatible with display capability properties of the call recipient communication device.

30. The system of claim 17, further comprising a database storing a plurality of pre-vetted verified calling party attributes, the pre-vetted verified calling party attributes indexable by one or more of the calling party name, a calling party telephone number indicated by the call initiation request, or pre-determined indexing parameters specified by the call initiation request.

* * * * *